US00RE38810E

(19) United States
(12) Reissued Patent
Terada et al.

(10) Patent Number: US RE38,810 E
(45) Date of Reissued Patent: Oct. 4, 2005

(54) IMAGE HEATING DEVICE AND IMAGE FORMING DEVICE USING THE SAME

(75) Inventors: Hiroshi Terada, Ikoma (JP); Akinori Toyoda, Katano (JP); Yoshihito Urata, Kantano (JP); Hajime Yamamoto, Ikoma (JP); Nobuo Genji, Osakasayama (JP); Naoaki Ishimaru, Minoo (JP); Tatsuo Nakatsugawa, Utsunomiya (JP); Masakazu Naito, Shioya (JP)

(73) Assignees: Matsushita Electric Industrial Co., Ltd., Osaka (JP); Panasonic Communications Co., Ltd., Fukuoka (JP)

(21) Appl. No.: 10/066,035

(22) Filed: Feb. 1, 2002

Related U.S. Patent Documents

Reissue of:
(64) Patent No.: 6,021,303
Issued: Feb. 1, 2000
Appl. No.: 09/309,922
Filed: May 11, 1999

(30) Foreign Application Priority Data

May 15, 1998 (JP) ..... 10-132984
Jul. 17, 1998 (JP) ..... 10-203005

(51) Int. Cl.[7] ..... G03G 15/20
(52) U.S. Cl. ..... 399/328; 399/329; 399/330; 399/335
(58) Field of Search ..... 399/320, 328, 399/329, 330, 333, 335, 336, 338

(56) References Cited

U.S. PATENT DOCUMENTS 4,256,945 A * 3/1981 Carter et al.
5,568,240 A * 10/1996 Ohtsuka
5,713,069 A * 1/1998 Kato ..... 399/330
5,724,637 A * 3/1998 Senba et al. ..... 399/333
5,745,833 A * 4/1998 Abe et al. ..... 399/330
5,752,148 A * 5/1998 Yoneda et al. ..... 399/329
5,765,086 A * 6/1998 Kishino et al. ..... 399/329
5,768,673 A * 6/1998 Morigami ..... 399/330
5,778,293 A * 7/1998 Ohtsuka
5,801,359 A * 9/1998 Mano et al. ..... 399/329 X
5,819,150 A * 10/1998 Hayasaki et al. ..... 399/330
5,822,669 A * 10/1998 Okabayashi et al. ..... 399/330
5,862,445 A * 1/1999 Ogawa et al. ..... 399/329
5,881,349 A * 3/1999 Nanataki et al. ..... 399/328
5,939,337 A * 8/1999 Hatakeyama et al. ... 399/335 X
5,940,655 A * 8/1999 Sano et al. ..... 399/328 X
6,035,174 A * 3/2000 Ito et al. ..... 399/328
6,049,691 A * 4/2000 Abe et al. ..... 399/330
6,078,780 A * 6/2000 Abe et al. ..... 399/328
6,226,488 B1 * 5/2001 Maeyama ..... 399/329 X

* cited by examiner

*Primary Examiner*—Sandra L. Brase
(74) *Attorney, Agent, or Firm*—Merchant & Gould P.C.

(57) ABSTRACT

An image heating device comprises a cylindrical heating roller with a Curie temperature of 210° C., a magnetization coil for magnetizing the heating roller with an alternating magnetic field, which is arranged inside the heating roller, and a nip portion for heating a recording material that carriers a toner image with heat from the heating roller, while the recording material is being conveyed along said nip portion. The ratio between the amount of heat generated in said heat-generating member at Curie temperature or higher to the amount of heat generated at room temperature in said heat-generating member is not more than ½. With this configuration, the heating roller can regulate its own temperature to stabilize at a temperature that is suitable for fixing, and the problems of partial overheating or underheating, unstable heat generation, or damage of the device can be eliminated.

40 Claims, 10 Drawing Sheets

IMAGE HEATING DEVICE AND IMAGE FORMING DEVICE USING THE SAME

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to an image heating device using electromagnetic induction heating and an image forming device using the same. More specifically, the present invention relates to an image heating device used in image forming devices, such as electrophotographical devices or electrostatic recording devices, that is suitable as a fixing device for thermally fixing unfixed toner, and to an image forming device using the same.

2. Description of the Prior Art

As image heating devices, for which thermofixing devices are a typical example, contact-heating devices such as heat-roller devices and film-heating devices are used conventionally.

In recent years, due to the demand for shorter warming-up periods and reduced energy consumption, there have been attempts to use electromagnetic induction heating, which generates heat with high efficiency and allows concentrated heating, for the heat source of these contact-heating image heating devices.

FIG. 10 shows an image heating device of the film-heating type, which is a typical example of a device using electromagnetic induction heating for the heat source (see Publication of Unexamined Japanese Patent Application No. Hei 7-114276). As is shown in FIG. 10, a magnetization coil 203 is wound around a core material 202 on the inner side of a rotating endless film 201. Using this coil, an alternating magnetic field can be caused to penetrate the film 201. Then, this alternating magnetic field induces an induction current in the film 201, which serves as heat-generating material and as heating material, and due to the heat generated by the induction current in the film 201, a toner image 206 is fixed on a recording material 205, which passes between the film 201 and a pressure roller 204. Numeral 207 in FIG. 10 denotes a thermistor for detecting the surface temperature of the pressure roller 204. Depending on the temperature detected by this thermistor 207, the current applied to the magnetization coil 203 is regulated. In this example, a special layering structure is devised for the film 201, so that the heat generated by the film 201 does not transmit as easily towards the side of the magnetization coil 203.

Including this conventional example, image heating devices using magnetic induction heating generally can heat necessary parts intensively and with high efficiency, so that they are useful as one means for reducing warming-up periods and saving energy.

However, in order to effectively reduce warming-up periods and save energy, it is necessary to reduce the thermal capacity of the heat-generating member or the heating member in addition to making the heating means more effective, which brings about new problems.

When the thermal capacity of the heat-generating member or the heating member is reduced, the temperature of the heat-generating member or the heating member reacts with sensitivity to changes in the generated heat or the escaping heat, which promotes temperature changes. Moreover, it is useful to reduce their thicknesses in order to reduce the thermal capacity, but then also their internal thermal conductivity worsens, so that partial temperature differences arise easily, and it becomes difficult to regulate the temperature of the entire heat-generating member or heating member to a uniform and stable temperature. The above-noted conventional image heating device using film-heating is an example where this problem is particularly apparent.

Moreover, in the regular film-heating method, the thermal capacity of the film is set as small as possible to reduce the warming-up period, but this gives rise to the problem that the film temperature partially becomes too high. When the film temperature becomes too high, the heat generation becomes unstable, and hot offset may occur, which in turn causes the destruction of the film and the components around it. Taking the conventional image heating device in FIG. 10 as an example, this problem is aggravated when a recording material 205 whose width is smaller than the width of the image heating device in the depth direction of the drawing is continuously being transported. This means, heat is dissipated into the recording material 205 at the portion where the recording material 205 is transported, so that the heating has to be performed correspondingly, but if portions where no recording material 205 is transported are heated simultaneously, the temperature in these portions will rise, because the thermal capacity of the film is small and the thermal conductivity in the width direction is poor. Then, when the temperature of the film partially becomes excessively high and a recording material 205 with broad width is transported, hot offset occurs, or the overall amount of heat generated becomes unstable, which in turn may result in damage of the magnetization coil 203, which provides heat generation. It is not possible to regulate such a partial temperature rise by detecting the temperature only in the film serving as the heat-generating member and heating member or other members in the above-described conventional example.

On the other hand, when the entire amount of heat generated is limited to prevent temperature rises, the temperature at the portions with high temperature absorption will drop, which may bring about insufficient fixing at these portions.

Not only in the film-heating method, but also when reducing the thermal capacity in the heat-roller method using a halogen lamp or magnetic induction by reducing the thickness of the roller in order to reduce the warming-up time, the same problems arise because of the instability of the generated heat and because of partial overheating and underheating. On the other hand, in the above-noted publication, an attempt was made to achieve temperature self-regulation using a film whose Curie temperature has been adjusted, but according to our experiments, it is difficult to achieve suitable temperature self-regulation using a heat-generating member (film) with that structure. In other words, in this example, the electrically conductive film is formed considerably thinner than the skin depth, and the cross-sectional area of the path where the induction current flows is the same above and below the Curie temperature, so that the amount of heat generated above and below the Curie temperature is almost the same. Consequently, with this conventional configuration, it is impossible to perform a suitable temperature regulation for the image heating device, so that it cannot solve the problem of partial temperature rises and drops.

One of the results of the research which lead to the present invention was that to achieve effective temperature self-regulation applicable for an image heating device, it is necessary that (i) during start-up, a large amount of heat is generated by letting almost the entire induction current flow through a highly resistive portion, (ii) once the Curie temperature is exceeded, the amount of heat generated is decreased by letting more induction current flow through a portion with low resistivity, and (iii) certain conditions should be satisfied so that the differences between these amounts of heat generated exceeds a certain value. Furthermore, to achieve optimum fixing, there is a certain range within which the temperature to be regulated has to be.

SUMMARY OF THE INVENTION

It is an object of the present invention to overcome the problems of the prior art. It is a further object of the present invention to provide an image heating device and an image forming device using the same, wherein the heating member itself can regulate its own temperature in a stable manner when an image is heated on a recording material, and suitable heating conditions can be attained even without a temperature detecting means, such as the thermistor, or temperature controlling circuits.

It is a further object of the present invention to provide an image heating device and an image forming device using the same, wherein, even when the thermal capacity of heat-generating members or heating members such as heating rollers or films is reduced, partial temperature deviations or excessive temperature rises can be reduced by temperature self-regulation.

It is a further object of the present invention to provide an image heating device and an image forming device using the same, wherein even when a recording material of narrow width is transported continuously, the portion where the recording material does not pass does not become excessively hot, and there is no hot offset and no partial under-heating.

It is a further object of the present invention to provide an image heating device and an image forming device using the same, wherein the generated heat does not become unstable due to excessively high temperatures, and where damaging of the magnetization coil, film, etc. due to heat can be avoided.

It is a further object of the present invention to provide an image heating device and an image forming device using the same, wherein the thermal capacity of the heat-generating member and the heating member can be reduced, and the warming-up period can be shortened.

In order to achieve these objects, an image heating device in accordance with a first configuration of the present invention comprises a heat-generating member comprising a magnetic layer with a certain Curie temperature; a magnetization member for magnetizing the heat-generating member with an alternating magnetic field, which is arranged in opposition to the heat-generating member; and a nip portion for heating a recording material that carries a toner image with heat from the heat-generating member, while the recording material is being conveyed along the nip portion. The ratio between an amount of heat generated in the heat-generating member at Curie temperature or higher to an amount of heat generated at room temperature in the heat-generating member is not more than ½. According to this first configuration of an image heating device, stable temperature self-regulation can be attained by the heat-generating member itself when the toner image is heated on the recording material. Consequently, even without the temperature detecting means, such as the thermistor, or temperature controlling circuits, suitable heating conditions can be attained. Furthermore, as the thermal capacity of the heat-generating member or the heating member becomes low, a partial temperature difference in the width direction of the recording material occurs easier, and the ability of the heat-generating member to regulate its own temperature also causes a partial difference in the heat generation, so that even when a recording material of narrow width is conveyed continuously by the nip portion, the portion where the recording material does not pass does not become excessively hot, and when subsequently a recording material of broader width is conveyed continuously by the nip portion, there is no hot offset. Consequently, since the thermal capacity of the heat-generating member or the heating member can be decreased within the scope where temperature self-regulation is possible, the warming-up time can be shortened.

In this first configuration of an image heating device according to the present invention, it is preferable that a thickness of the magnetic layer is at least twice a thickness of a skin depth. With this preferable configuration, the ratio of the amount of heat generated above the Curie temperature to the amount of heat generated at room temperature can be reduced to less than ½, so that stable temperature regulation becomes possible.

In this first configuration of an image heating device according to the present invention, it is preferable that the heat-generating member further comprises a conductive layer with lower resistance than the magnetic layer, which is provided adjacent to the magnetic layer. With this preferable configuration, the ratio of the amount of heat generated above the Curie temperature to the amount of heat generated at room temperature can be reduced considerably without increasing the thickness of the layers for the heat-generating member so much. In this case, it is preferable that $$\rho 1/t\mathbf{1} \geqq \rho 2/t\mathbf{2} \qquad \text{(Eq. 1)}$$

wherein ρ1 is an intrinsic resistance of the magnetic layer, t1 is a thickness of the magnetic layer, ρ2 is an intrinsic resistance of the conductive layer, and t2 is a thickness of the conductive layer. With this preferable configuration, the ratio of the amount of heat generated above the Curie temperature to the amount of heat generated at room temperature can be reduced to less than ½. In this case it is also preferable that the thickness of the magnetic layer is equivalent or higher than the skin depth. With this preferable configuration, almost the entire induction current can be concentrated at the magnetic layer due to the skin effect.

In this first configuration of an image heating device according to the present invention, it is preferable that the nip portion is formed by at least a portion of the heat-generating member, and a pressure member pressed against this portion of the heat-generating member. Furthermore, in this case it is preferable that at least the magnetic layer of the heat-generating member is a rotatable roller. Furthermore, in this case it is preferable that at least the magnetic layer of the heat-generating member is a movable film. Furthermore, in this case, it is preferable that at least the conductive layer of the heat-generating member is a movable film.

In this first configuration of an image heating device according to the present invention, it is preferable that the nip portion is formed by a movable film contacting the heat-generating portion, and a pressure member for pressing against the film. Furthermore, in this case, it is preferable that the heat-generating member contacts a rear surface of the film. Furthermore, in this case, it is preferable that the heat-generating member contacts the rear surface of the film from a position upstream of the nip portion to a vicinity of the nip portion, and the magnetization member is provided at the position upstream of the nip portion. According to these preferable configurations, the amount of heat generated can be kept stable, because the magnetization member is not heated up by the temperature of the nip portion. Furthermore, in this case, it is preferable that the heat-generating member is provided on the rear side of the film and contacts a portion of the film, and the magnetization member is provided on a surface side of the film. With this preferable configuration, the amount of heat generated can be kept stable, because the magnetization member is not heated up by the temperature of the heat-generating member. Furthermore, in this case, it is preferable that the pressure member comprises a roller with low thermal conductivity provided on the rear surface side of the film and a pressure roller provided on the front surface side of the film. With this preferable configuration, the formation of the nip portion, which requires a strong pressure force, is performed by the pressure between the roller with low thermal conductivity and the pressure roller, so that there is no portion that slides while a large friction force is exerted to form the nip portion, which is suitable for operation at high speeds over extended periods of time. Furthermore, in this case, it is preferable that the heat-generating member comprises a rotatable roller. Furthermore, in this case, it is preferable that the film is loop-shaped.

An image heating device in accordance with a first configuration of the present invention comprises a heat-generating member comprising a magnetic layer with a certain Curie temperature, and a magnetization member for magnetizing the heat-generating member with an alternating magnetic field, which is arranged in opposition to the heat-generating member. When the device is in operation, a temperature at which the heat-generating member stabilizes due to a drop of a relative magnetic permeability of the magnetic layer near the Curie temperature is higher than a temperature where cold offset begins. The Curie temperature is selected such that, when the temperature of the heat-generating member is stabilized, a temperature of the heat-generating member at an outgoing portion of the nip portion is lower than a temperature where hot offset of the toner begins. With this second configuration of an image heating device according to the present invention, unfixed toner can be fixed in a stable manner without hot offset.

In this second configuration of an image heating device according to the present invention, it is preferable that the heat-generating member further comprises a conductive layer with lower resistance than the magnetic layer, which is provided adjacent to the magnetic layer. Furthermore, in this case it is preferable that $$\rho 1/t\mathbf{1} \geqq \rho 2/t\mathbf{2} \quad \text{(Eq. 1)}$$

wherein ρ1 is an intrinsic resistance of the magnetic layer, t1 is a thickness of the magnetic layer, ρ2 is an intrinsic resistance of the conductive layer, and t2 is a thickness of the conductive layer.

In this second configuration of an image heating device according to the present invention, it is preferable that $$Tc \leqq Tk \leqq Th + 70^\circ\ C. \quad \text{(Eq. 2)}$$

wherein Tc is the temperature where cold offset of the toner begins in the nip portion, Tk is the Curie temperature, and Th is the temperature where hot offset of the toner begins in an outgoing portion of the nip portion.

In this second configuration of an image heating device according to the present invention, it is preferable that $$140^\circ\ C. \leqq Tk \leqq 280^\circ\ C. \quad \text{(Eq. 3)}$$

wherein Tk is the Curie temperature.

In this second configuration of an image heating device according to the present invention, it is preferable that the nip portion is formed by at least a portion of the heat-generating member, and a pressure member pressed against this portion. Furthermore, in this case, it is preferable that at least the magnetic layer of the heat-generating member is a rotatable roller. Furthermore, in this case, it is preferable that at least the magnetic layer of the heat-generating member is a movable film. Furthermore, in this case, it is preferable that at least the conductive layer of the heat-generating member is a movable film.

In this second configuration of an image heating device according to the present invention, it is preferable that the nip portion is formed by a movable film contacting the heat-generating portion, and a pressure member for pressing against the film. Furthermore, in this case, it is preferable that the heat-generating member contacts a rear surface of the film. Furthermore, in this case, it is preferable that the heat-generating member contacts the rear surface of the film from a position upstream of the nip portion to a vicinity of the nip portion, and the magnetization member is provided at the position upstream of the nip portion. Furthermore, in this case, it is preferable that the heat-generating member is provided on the rear side of the film and contacts a portion of the film, and the magnetization member is provided on a surface side of the film. Furthermore, in this case, it is preferable that the pressure member comprises a roller with low thermal conductivity provided on the rear surface side of the film and a pressure roller provided on the front surface side of the film. Furthermore, in this case, it is preferable that the heat-generating member comprises a rotatable roller. Furthermore, in this case, it is preferable that the film is loop-shaped.

An image formation device according to the present invention comprises an image formation system for forming an unfixed image onto a recording material; and a thermal fixing device for thermally fixing the unfixed image on the recording material, wherein an image heating device according to the present invention used as the thermal fixing device.

DESCRIPTION OF THE PREFERRED EMBODIMENTS

The following is a more detailed description of the present invention with reference to the accompanying drawings.

Figure 9:
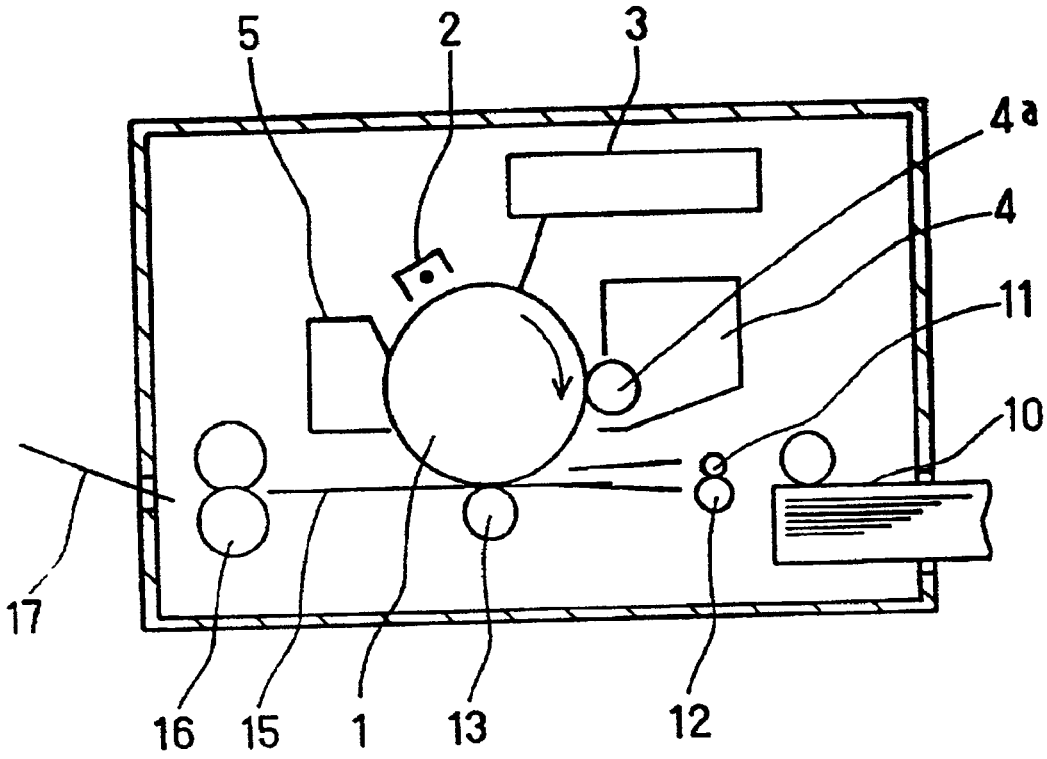
FIG. 9 is a cross-sectional view showing an image forming device using an image heating device according to an embodiment of the present invention as a fixing device.
Figure 10:
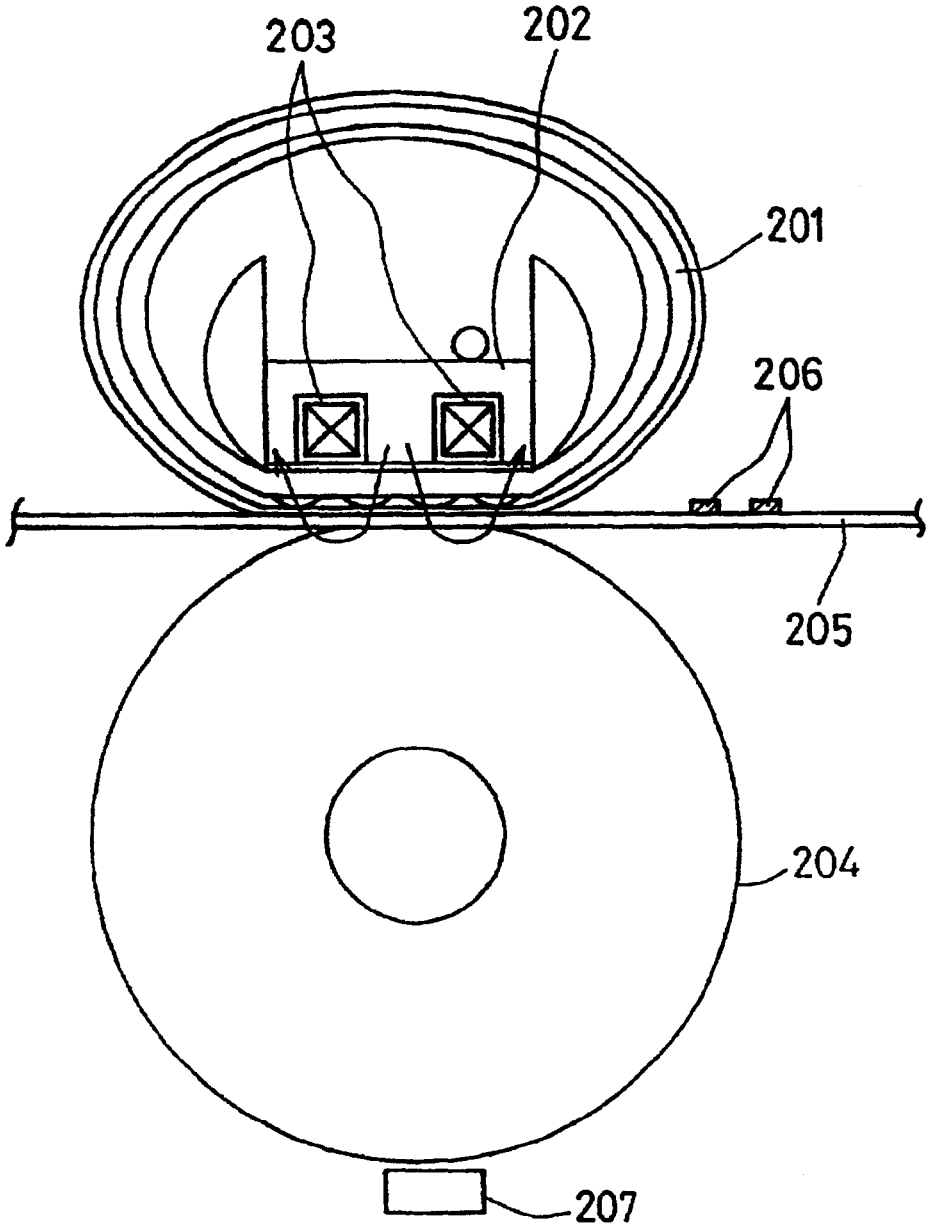
FIG. 10 (PRIOR ART)
FIG. 10 is a cross-sectional view showing the configuration of a conventional image heating device.

FIG. 9 is a cross-sectional drawing showing an image forming device using an image heating device according to an embodiment of the present invention as the fixing device.

In FIG. 9, numeral 1 denotes an electrophotographic photoreceptor (referred to as "photosensitive drum" in the following). While this photosensitive drum is rotated at a certain velocity in the arrow direction, its surface is charged evenly to a certain negative dark potential $V_0$.

Numeral 3 denotes a laser beam scanner, which outputs a laser beam that is modulated in accordance with a serial electric digital image signal of image information that is input from a host device (not shown in the drawings) such as an image reading device or a computer. The surface of the photosensitive drum 1, which has been charged evenly to the dark potential $V_0$, is scanned and exposed by the laser beam, and the absolute potential of the exposed portion is decreased to the light potential $V_L$. Thus, a static latent image is formed on the surface of the photosensitive drum. Then, using a developer 4, this static latent image is reversely developed with negatively charged powdered toner and made manifest.

The developer 4 has a rotating developing roller 4a, which is arranged parallel and in opposition to the photosensitive drum 1. When a developing bias voltage, whose absolute value is lower than the dark potential $V_0$ of the photoelectric drum 1 and higher than the light potential $V_L$, is applied to the developing roller 4a, a negatively charged thin toner layer is formed on the peripheral surface of the developing roller 4a. The toner on the developing roller 4a transfers only to the portion of the photosensitive drum 1 with the light potential $V_L$, a toner image is formed, and the static latent image is made manifest.

The recording material 15 is fed one by one from a paper-feed portion 10, passes a pair of resist rollers 11 and 12, and with a nip portion consisting of the photosensitive drum and a transfer roller contacting the same, the recording material 15 is fed with suitable timing and in synchronization with the rotation of the photosensitive drum 1. Then, by using transfer roller 13 to which a transfer bias is applied, the toner image on the photosensitive drum 1 is sequentially transferred to the recording material 15. After the recording material 15 has passed between the photosensitive drum 1 and the transfer roller 13, it is fed into a fixing device 16, which fixes the transferred toner image. The recording material 15 onto which the toner image has been fixed is then delivered into a paper eject tray 17.

After the recording material 15 has passed the photosensitive drum 1, the surface of the photosensitive drum 1 is cleaned with a cleaning device 5, which removes residual material, such as remaining toner. By repeating these steps, sequential image formation is possible.

The following is a more detailed explanation of an image heating device in accordance with the present invention, with reference to specific examples.

First Example

Figure 1:
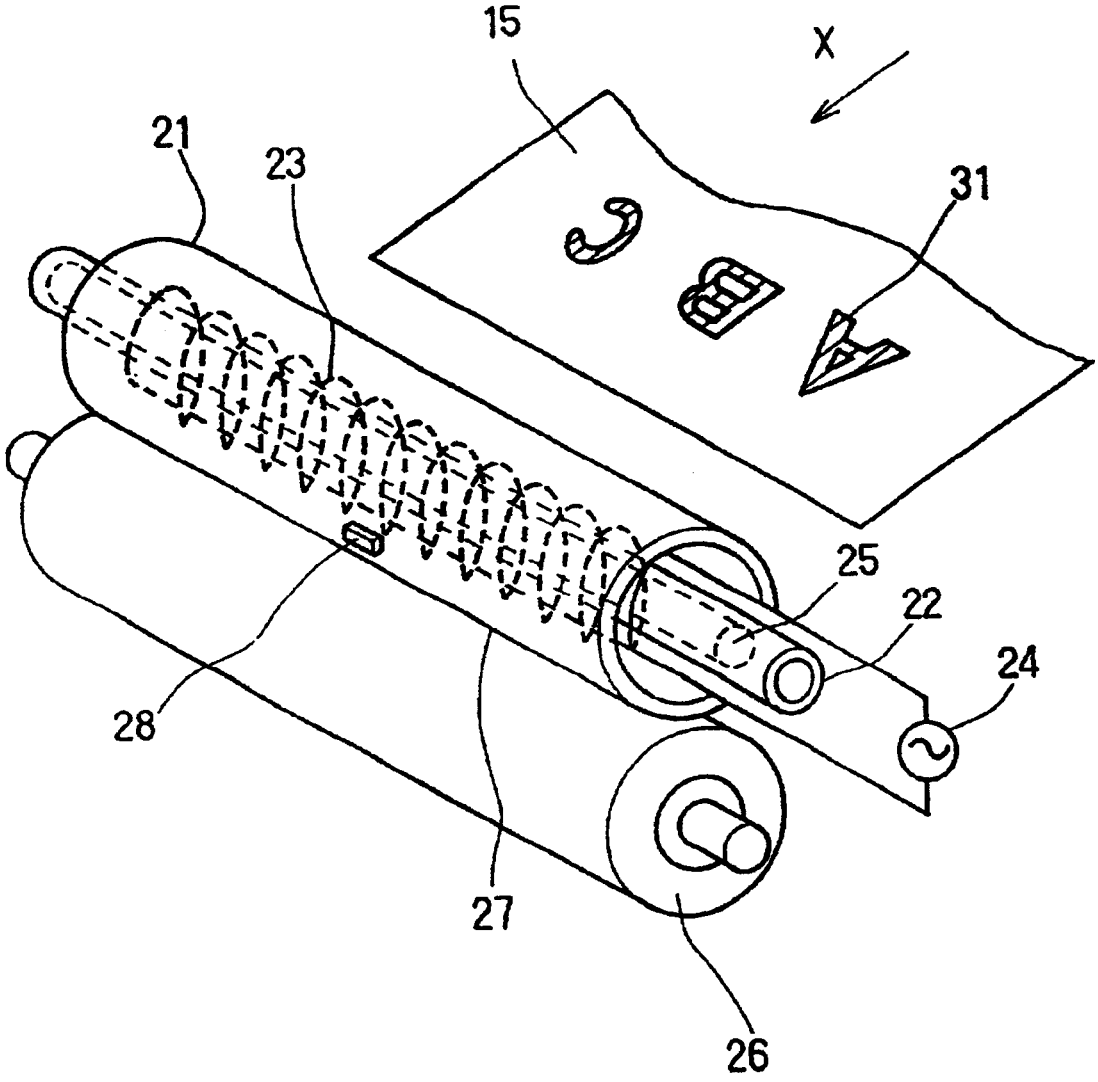
FIG. 1 is a perspective view illustrating the configuration of an image heating device according to a first example of the present invention.

FIG. 1 is a perspective view showing an image heating device in accordance with a first example of the present invention. In this example, a fixing device using heating rollers made of magnetic material is used for the image heating device.

As is shown in FIG. 1, a heating roller 21, serving as a heat-generating member and as a heating member, has a cylindrical magnetic alloy of 45 mm diameter and 1 mm thickness as a base, whose composition is adjusted so that the Curie temperature becomes about 210° C. The surface of the heating roller 21 is coated with a fluorocarbon resin of 15 $\mu$m thickness for aiding the lubrication of the toner. In this example, an alloy of iron, nickel and chrome (intrinsic resistivity: $7.2\times10^{-7}$ Ωm, relative magnetic permeability at room temperature: ca. 100, relative magnetic permeability above the Curie temperature: ca. 1) was used. The material for the alloy and its composition can be changed in accordance with the saturation magnetic flux density and the desired Curie temperature.

The heating roller 21 is supported rotatably against the fixing device itself by bearings (not shown in the drawings). An induction heating portion for inductively heating the heating roller 21 is provided inside the heating roller 21, and fixed with respect to the fixing device. This induction heating portion comprises a magnetization coil 23 as a magnetization member, which is wound around a cylindrical bobbin 22 arranged inside the heating roller 21, and an AC current source 24 for feeding high-frequency alternating current into the magnetization coil 23. To increase the heating efficiency, a ferrite 25 is inserted into the bobbin 22 as a core. For the magnetization coil 23, a litz wire of bundled thin wires is used.

Numeral 26 denotes a pressure roller whose surface is made of silicone rubber which is supported rotatably by the main body of the fixing device by bearings (not shown in the drawings). The present roller 26 is arranged in parallel to the heating roller 21. When the silicone rubber of the pressure roller 26 is pressed onto the heating roller 21, it deforms, so that a nip portion 27, i.e. an area of certain pressure, is formed between the heating roller 21 and the pressure roller 26. In other words, the heating roller 21 and the pressure roller 26 constitute a nip forming means. The heating roller 21, onto which the nip portion 27 is formed, is rotated by a driving system (not shown in the drawing), and the pressure roller 26 rotates following the heating roller 21. Numeral 28 denotes a thermistor for detecting the temperature on the surface of the heating roller 21 near an outgoing portion of the nip portion 27.

The recording material 15, whose surface carries the toner image 31 that has not yet been fixed, is inserted into the fixing device in arrow direction X, and is heated by the heat of the heating roller 21, while is sandwiched and conveyed by the nip portion 27, thereby fixing the toner image 31 onto the recording material 15.

Alternating current of 23 kHz frequency from a current source 24 is fed into the magnetization coil 23 of this fixing device, and a certain period of time after starting the heating of the heating roller 21, the heating roller 21 is rotated with a velocity of 200 mm/sec. The surface temperature of the heating roller 21 is detected by the thermistor 28. It could be established that a certain period after departing from room temperature, the surface temperature of the heating roller 21 is stabilized around 190° C.

After the temperature has been stabilized, the recording material 15 is continuously conveyed by the nip portion 27, and the surface temperature near the outgoing portion of the nip portion 27 of the heating roller is detected with the thermistor 28. It could be established that the surface temperature near the outgoing portion of the nip portion of the heating roller 21 is stabilized around 165° C.

The following is an explanation of the relation between the amount of heat generated in the heating roller and the regulated temperature.

Figure 2:
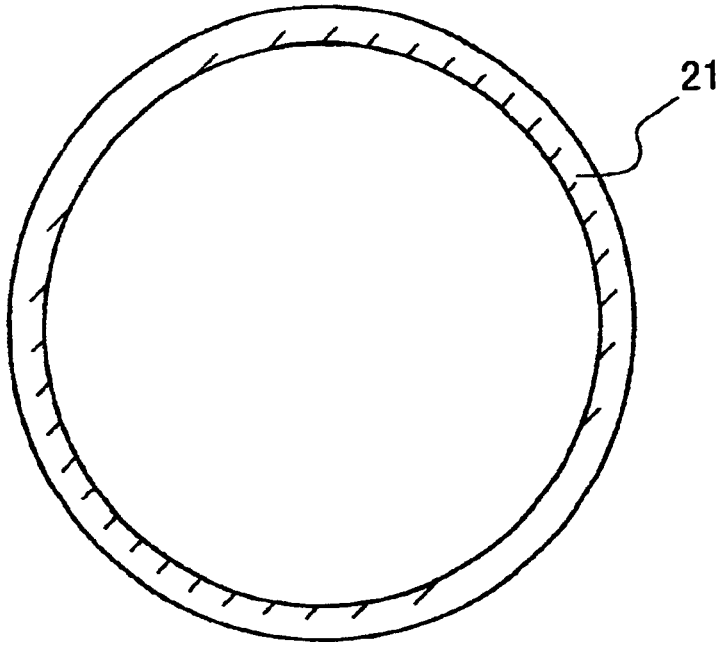
FIGS. 2a and b are diagrams illustrating the temperature self-regulation of an image heating device according to the first example of the present invention.
Figure 2:
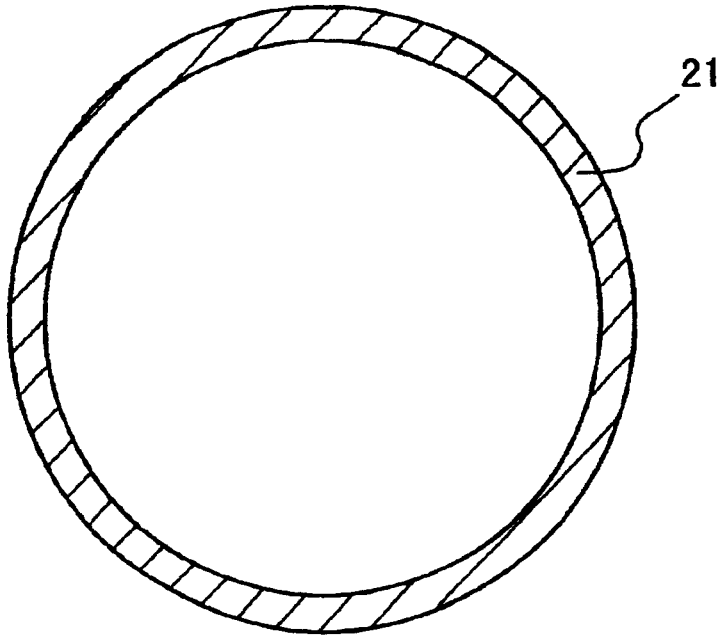

First of all, when high-frequency alternating current is supplied to the magnetization coil 23, a corresponding high-frequency alternating magnetic field is generated, and this high-frequency magnetic field interlinks with the heating roller 21. Thus, an induction current is induced inside the heating roller 21, and the heating roller 21 is inductively heated. Since the heating roller is made of a magnetic alloy whose composition is adjusted so that its Curie temperature becomes about 210° C., there is a considerable difference between the induction current flowing when the temperature is below the Curie temperature and when the temperature is near the Curie temperature or above it. In other words, the heating roller 21 has the ability of temperature self-regulation. FIGS. 2(a) and (b) are drawings illustrating this ability of regulating its own temperature.

In FIG. 2(a), the hatched area corresponds to the area where an induction current flows when the heating roller 21 is near room temperature. As is shown in FIG. 2(a), the induction current concentrates in a portion of a certain thickness on the inner surface of the heating roller 21, which is due to the skin effect. The thickness of the portion where most of the induction current flows, that is, the skin depth δ[m] can be expressed theoretically by the intrinsic resistance ρ[Ωm] of the material, the magnetization frequency f[Hz], and the relative magnetic permeability $\mu$ of the material:

$$\delta=503.3\ \{\rho/(f\times\mu)\}^{0.5} \qquad \text{(Eq. 4)}$$

In this example, since a magnetic alloy with an intrinsic resistance of $7.2\times10^{-7}$ Ωm and a relative magnetic permeability at room temperature of about 100 is used for the heating roller 21, and since the magnetization frequency is about 23 kHz, a skin depth of about 0.28 mm can be calculated. In other words, near room temperature, almost the entire induction current is concentrated in a region of about 0.28 mm thickness from the inner surface of the heating roller 21.

In FIG. 2(b), the hatched area corresponds to the area where an induction current flows when the heating roller 21 is above the Curie temperature. In this case, the relative magnetic permeability of the heating roller 21 becomes about 1, so that the thickness corresponding to the skin depth δ becomes about 10 times the skin depth at room temperature. Therefore, the induction current flows over the entire thickness of 1 mm of the heating roller 21, as is shown in FIG. 2(b).

By changing the induction current, the thickness of the portion through which an induction current flows at temperatures above the Curie temperature is about three times higher than at room temperature, which reduces the total resistance. Consequently, when magnetization is performed with a constant current, the amount of heat generated is about one third, since it is proportional to the resistance.

Figure 3:
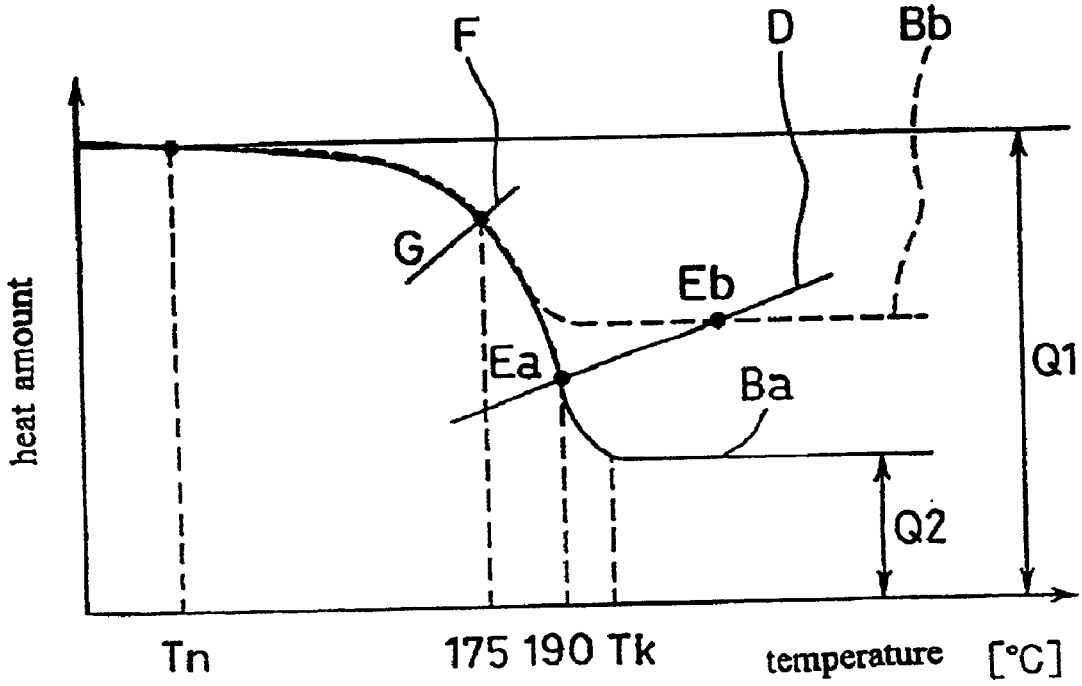
FIG. 3 is a diagram illustrating the relation between the amount of heat generated by the heating roller and the temperature in an image heating device according to a first example of the present invention.

FIG. 3 shows the generated heat Ba as a function of the temperature of the material of the heating roller 21. In FIG. 3, the horizontal axis marks the temperature of the material of the heating roller 21 (assuming that the temperature is distributed evenly across the heating roller 21), and the vertical axis shows the amount of heat generated. Actually, the relative magnetic permeability of the material of the heating roller 21 does not change abruptly from 100 to 1 at the Curie temperature Tk, but rather decreases gradually as the Curie temperature is approached, so that the amount of heat generated also decreases gradually as the temperature is increased, and drops sharply near the Curie temperature Tk. Above, the Curie temperature Tk, the range in which an induction current flows becomes the entire thickness of the heating roller 21, and the amount of generated heat stabilizes at a constant value. In this example, the ratio between the amount of heat Q1 generated at room temperature Tn and the amount of heat Q2 generated at temperatures above the Curie temperature is about 3:1.

The temperature where the heating roller 21 finally stabilizes (stabilizing temperature) is the temperature where the amount of heat dissipating away from the heating roller 21 balances against the amount of heat generated by this magnetic induction heating. Generally speaking, a certain amount of heat escapes from the heating roller 21 of the fixing device due to heat transmission over the supporting bearings or the pressure roller 26, or through radiation and convection into the atmosphere. This dissipated amount of heat becomes larger with increasing temperature of the heating roller 21. When this dissipated amount of heat is expressed as a thermal dissipation curve, the curve D in FIG. 3 results. The intersection Ea between the thermal dissipation curve D and the generated heat curve Ba indicates the stabilization temperature. The fact that in this example the surface temperature of the heated heating roller 21 when no recording paper 15 was transported stabilized at 190° C. means that this intersection Ea is at 190° C. However, if the temperature of the thermal roller 21 were examined in detail, it is possible that there is a temperature distribution, and that the point where the amount of heat generated balances the temperature varies slightly between different portions, but as for the average situation in the entire heating roller 21, the above consideration can be regarded as valid.

When the recording material 15 is conveyed continuously by the nip portion 27, the surface temperature of the heating roller 21 near the outgoing portion of the nip portion 27 stabilizes at 165° C., because the entire thermal load for the heating roller 21 is increased by the amount of heat that dissipates into the recording material 15. Since the temperature is measured near the outgoing portion of the nip portion 27, the somewhat lower temperature near the surface of the heating roller 21 after heat has been consumed by the recording material 15 is shown, the average temperature of the entire heating roller 21 is regulated to a temperature that is lower than the temperature when no recording material is being transported. In FIG. 3, F denotes the thermal dissipation curve when recording material 15 is conveyed continuously by the nip portion 27, and G denotes the stabilization point where the heat balance is in equilibrium. The point G represents the average temperature of the entire heating roller 21, and is about 175° C., i.e. slightly higher than the 165° C. measured above.

Next, the thermal loss in a typical fixing device was measured. When the process velocity was 150 mm/sec, and the regulated roller temperature was 180° C., the total amount of heat was about 490 W. Of these 490 W, about 47% (ca. 230 W) were consumed by the recording material, and the other 53% were dissipated into the pressure roller and the supporting portions, or radiated into the atmosphere. When the process speed was changed, the total amount of heat changed with the amount of heat consumed by the recording material, but at the most frequently used process speed of 100–250 mm/sec, when the amount of heat was calculated on the basis of the heat measured after the recording material has passed by nip portion, the amount of heat consumed by the recording material per total amount of heat near the fixing temperature was about ½ or less, and this ratio was fairly stable. Thus, it can be seen that in most cases, the amount of heat at the stabilization point Ea in FIG. 3 when no recording material 15 is transported is at least ½ of the amount of heat at the stabilization point G when recording material 15 is continuously conveyed by the nip portion 27.

In order to stabilize the temperature of the heating roller 21 regardless of whether there is a recording material 15, it is preferable that both stabilization points Ea and G are located in the portion of the slope of the generated heat curve Ba where the amount of heat generated near the Curie temperature Tk drops sharply. In other words, if the ratio between the amount Q2 of heat generated above the Curie temperature to the amount Q1 of heat generated at room temperature Tn becomes larger than ½ in the generated heat curve Bb (dashed line) and if the stabilization point G is placed in the portion where the slope of the amount of heat generated drops sharply, then the point of stabilization when no recording material 15 is being transported will correspond to a certain heat Eb above the Curie temperature Tk, so that the temperature regulation becomes very unstable if the dissipation curve is almost horizontal.

Thus, it is necessary to make sure that the ratio between the amount Q2 of heat generated above the Curie temperature to the amount Q1 of heat generated at room temperature Tn is less than ½. If the ratio between the amount Q2 of heat generated at a temperature above the Curie temperature Tk to the amount Q1 of heat generated at room temperature Tn is ⅓ or less, then a very stable temperature regulation becomes possible, regardless of whether a recording material 15 is present or not.

Therefore, if the thickness of the magnetic alloy for the heating roller 21 is at least twice the thickness of the skin depth corresponding to the magnetization frequency, then the ratio of the amount of heat generated above the Curie temperature to the amount of heat generated at room temperature becomes less than ½, and a stable temperature regulation becomes possible.

Next, using a halogen lamp and the thermistor 28, the relation between the temperature of the heating roller 21 and toner offset was determined. As a result, it became clear that at the speed set for the present example, cold offset (toner is not completely melted and sticks to the heating roller 21) begins when the surface temperature of the heating roller 21 near the ingoing portion of the nip portion 27 drops below 160° C., and hot offset (melted toner sticks to the heating roller 21) begins when the surface temperature of the heating roller 21 near the outgoing portion of the nip portion 27 drops exceeds 210° C. Thus, it was determined that cold offset begins at a temperature Tc of 160° C., and hot offset begins at a temperature Th of 210° C.

In summary, the stabilization temperature at which the heating roller 21, which is a heat-generating member and a heating member, stabilizes its own temperature is not the Curie temperature itself, but is dependent on the heat generation curve and the amount of dissipated heat, that is, the thermal load. On the other hand, to fix the unfixed toner image reliably without offset onto the healing roller 21, the temperature of some portion inside the nip portion 27 must be higher than Tc, which is the lowest temperature at which melt-adhesion is possible, and the temperature at the outgoing portion of the nip portion 27 has to be at most Th, which is the temperature where hot offset of the toner begins.

First of all, because there is the possibility that the stabilization temperature in the maximum case becomes close to the Curie temperature, the Curie temperature Tk has to be at least Tc or higher.

On the other hand, how high the Curie temperature Tk can be set, depends on how much the temperature can be regulated away from a predetermined Curie temperature, or in other words, on how much lower than the Curie temperature Tk the stabilization point G in FIG. 3 and the surface temperature of the heating roller 21 at the outgoing portion of the nip portion 27 can be set. Consequently, a necessary condition for the Curie temperature Tk is that Tk is not more than Th plus the largest possible temperature difference $\alpha$ that is possible between the surface temperature of the heating roller 21 at the outgoing portion of the nip portion 27 and the Curie temperature Tk. This temperature difference $\alpha$ can be determined from the form of the generated heat curve Ba and the dissipation curve, which is dependent on the configuration of the fixing device and the speed.

Thus, a necessary condition for the Curie temperature Tk is $$Tc \leqq Tk \leqq Th+\alpha. \quad \text{(Eq. 5)}$$

In this example, the surface temperature of the heating roller 21 near the nip portion 27 stabilizes at about 165° C., which is about 45° C. lower than the Curie temperature Tk. This stabilization temperature is sufficiently lower than 210° C., which is the temperature Th at which hot offset begins, so that hot offset can be avoided. How high the maximum temperature difference $\alpha$ in regular fixing devices can be, is explained further below.

A fixing device with the above configuration was used in the image forming device shown in FIG. 9. The recording material 15, onto which the toner image has been transferred, was inserted into the fixing device in the arrow direction with the side whereon the toner 31 has been applied facing the heating roller 21, as shown in FIG. 1, thereby fixing the toner 31 onto the recording material 15.

According to this example, the heating roller 21 itself, which serves as a heat-generating member, has the ability to regulate its own temperature, so that by setting the Curie temperature Tk to a suitable value with regard to the fixing temperature, the temperature regulation can be performed automatically. Consequently, even without a temperature detecting means, such as the thermistor, or temperature controlling circuits, suitable heating conditions can be attained. When the thermal capacity of the heating roller 21, which is also a heating member, is low, a partial temperature difference in the width direction of the recording material 15 occurs easier, the ability of the heating roller 21 to regulate its own temperature also causes a partial difference in the heat generation, so that even when a recording material 15 of narrow width is conveyed continuously by the nip portion 27, the portion where the recording material 15 does not pass does not become excessively hot, and when subsequently a recording material 15 of broader width is conveyed continuously by the nip portion 27, there is no hot offset. Consequently, since the thermal capacity of the heating roller 21 can be decreased within the scope where temperature self-regulation is possible, the warming-up time can be shortened.

Second Example

Figure 4A:
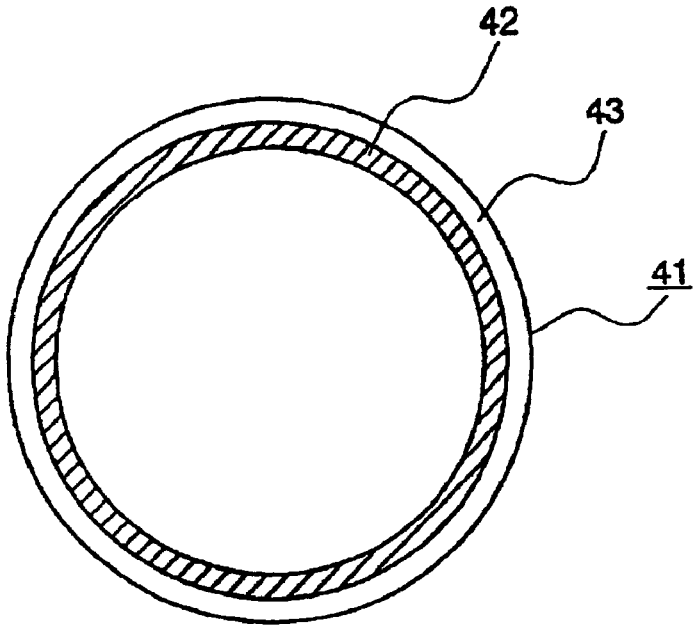
FIGS. 4a and b are diagrams illustrating the temperature self-regulation of an image heating device according to the second example of the present invention.

The following is an explanation of a second example of a fixing device. The fixing device of this example differs from the fixing device of the first example only in the configuration of the heating roller, so that the drawings of the entire configuration have been omitted, and in the following explanations, structure elements performing the same function as in the first example are referred to with the same numerals. FIGS. 4(a) and (b) are cross-sectional drawings showing the configuration of a heating roller, which serves as a heat-generating member and a heating member, according to this example. This drawing illustrates the temperature self-regulation, which is similar to the first example. The heating roller 41, which serves as a heat-generating member and a heating member, is provided on the inside with a magnetic alloy layer 42 of 0.3 mm thickness, whose composition is adjusted so that its Curie temperature becomes about 210° C., and on the outside with an aluminum layer 43 of 0.3 mm thickness, which serves as a highly conductive layer. The surface of the heating roller 41 is coated with a fluorocarbon resin of 15 $\mu$m thickness for aiding the lubrication of the toner. Also in this example, as in the first example, an alloy of iron, nickel and chrome (intrinsic resistivity: $7.2\times10^{-7}$ Ωm, relative magnetic permeability at room temperature: ca. 100, relative magnetic permeability above the Curie temperature: ca. 1) was used.

Alternating current of 23 kHz frequency from a current source 24 is fed into the magnetization coil 34 of this fixing device, and a certain period of time after starting the heating of the heating roller 41, the heating roller 41 is rotated with a velocity of 200 mm/sec. The surface temperature of the heating roller 41 is detected by the thermistor 28. It could be established that a certain period after departing from room temperature, the surface temperature of the heating roller 41 stabilized around 190° C.

After the temperature has been stabilized, the recording material 15 is conveyed continuously by the nip portion 27, and the surface temperature of the heating roller 41 near the outgoing portion of the nip portion 27 is detected with the thermistor 28. It could be established that the surface temperature of the heating roller 41 near the outgoing portion of the nip portion 27 stabilized around 175° C. Consequently, in this example, the temperature difference between the surface temperature of the heating roller 41 at the outgoing portion of the nip portion 27 and the Curie temperature is about 35° C.

In this example, as in the first example, there is a considerable difference between the induction current flowing in the heating roller 41 when the temperature is below the Curie temperature and when the temperature is near the Curie temperature or above it. In other words, the heating roller 41 has the ability of regulating its own temperature.

In FIG. 4(a), the hatched area corresponds to the area where an induction current flows when the temperature of the heating roller 41 is near room temperature. Since in this example the same magnetic alloy is used for the magnetic alloy layer 42 as in the first example, the skin depth 6 becomes about 0.28 mm, which is roughly the same as the thickness of the magnetic alloy layer 42 (0.3 mm). In other words, as shown in FIG. 4(a), almost the entire induction current concentrates due to the skin effect and flows only in the magnetic alloy layer 42. Therefore, the thickness of the magnetic alloy layer 42 should be at least equal to the skin depth.

Figure 4B:
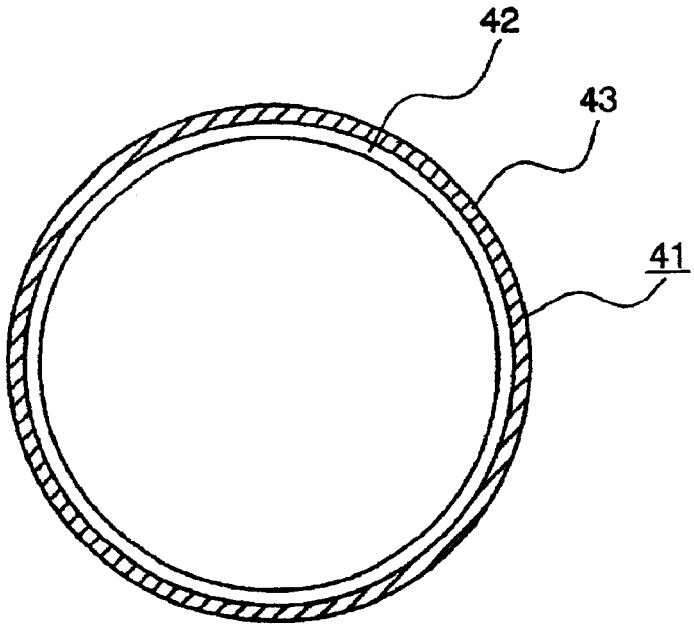

In FIG. 4(b), the hatched area corresponds to the area where an induction current flows when the temperature of the heating roller 41 is above the Curie temperature. As is shown in FIG. 4(b), almost the entire induction current flows in the outer aluminum layer 43. Since in this situation the relative magnetic permeability of the magnetic alloy layer 42 becomes about 1, the magnetic flux penetrates the magnetic alloy layer 42, and the induction current tends to spread out over the entire thickness of the heating roller 41, but because the electrical resistance of the aluminum layer 43 is much smaller than that of the magnetic alloy layer 42, it can be assumed that almost the entire induction current flows in the aluminum layer 43.

The magnetic alloy used in this example has an intrinsic resistance of $7.2\times10^{-7}$ Ωm, as in the first example, whereas the intrinsic resistance of the aluminum is $2.5\times10^{-8}$ Ωm, i.e. only 1/29 of the magnetic alloy material. The thickness of the portion where the induction current flows is in both layers about 0.3 mm, so that when magnetization is performed with a constant current, the amount of heat generated above the Curie temperature is about 1/29 of the amount of heat generated at room temperature.

As above, for a heating roller 41 with the dual layer configuration of this example, the amount of heat generated at a temperature near the Curie temperature or above the Curie temperature can be reduced considerably compared to the amount of heat generated at room temperature, without increasing the layer thickness very much. As explained above, to stabilize the temperature of the heating roller 12 in a regular fixing device regardless of whether there is a recording material or not, the ratio of the amount of heat generated above the Curie temperature to the amount of heat generated at room temperature has to be ½ or less. When the heating roller 41 with dual layer structure of this example is used, if the electric resistance of the entire highly conductive layer (in this example, the aluminum layer 43) is not higher than the electric resistance of the entire magnetic layer, the ratio of the amount of heat generated above the Curie temperature to the amount of heat generated at room temperature can be set to ½ or less by adjusting the frequency of the high-frequency current to set the skin depth to about the thickness of the magnetic layer. In other words, if $$\rho 1/t1 \geqq \rho 2/t2 \qquad \text{(Eq. 1)}$$

wherein the intrinsic resistance of the magnetic layer is ρ1 and its thickness is t1, and the intrinsic resistance and the thickness of the highly conductive layer are ρ2 and t2, then the ratio of the amount of heat generated above the Curie temperature to the amount of heat generated at room temperature can be set to ½ or less. If the intrinsic resistance of the highly conductive layer is very small, the same effect can be attained with a very thin layer. This is especially useful when it is necessary to decrease the thermal capacity of the heat-generating member or the heating member in order to reduce the warming-up period.

Using the heating roller 41 with the dual layer configuration of this example, the ratio between the amount of heat generated at room temperature to the amount of heat generated above the Curie temperature can be reduced easily, and since the generated heat curve drops sharply towards the Curie temperature, the regulated temperature can be set near the Curie temperature. As pointed out above, the temperature difference between the surface temperature of the heating roller 41 at the outgoing portion of the nip portion 27 and the Curie temperature in this example is about 35° C.

In this example, an aluminum layer 43 was used for the highly conductive layer, but the same effect also can be attained when highly conductive material such as copper, nickel etc. is used.

Furthermore, in this example, a heating roller 41 with a dual layer configuration of a highly conductive layer layered on a magnetic layer was used, but it is also possible to use a heating roller comprising only a magnetic layer, and providing a highly conductive layer adjacent in a non-contacting manner thereto, which surrounds a periphery of the magnetic layer excluding the nip portion. In such a non-contact dual layer structure, the thermal capacity of the heating roller, which serves as a heat-generating member and as a heating member, can be reduced even further.

Third Example

Figure 5:
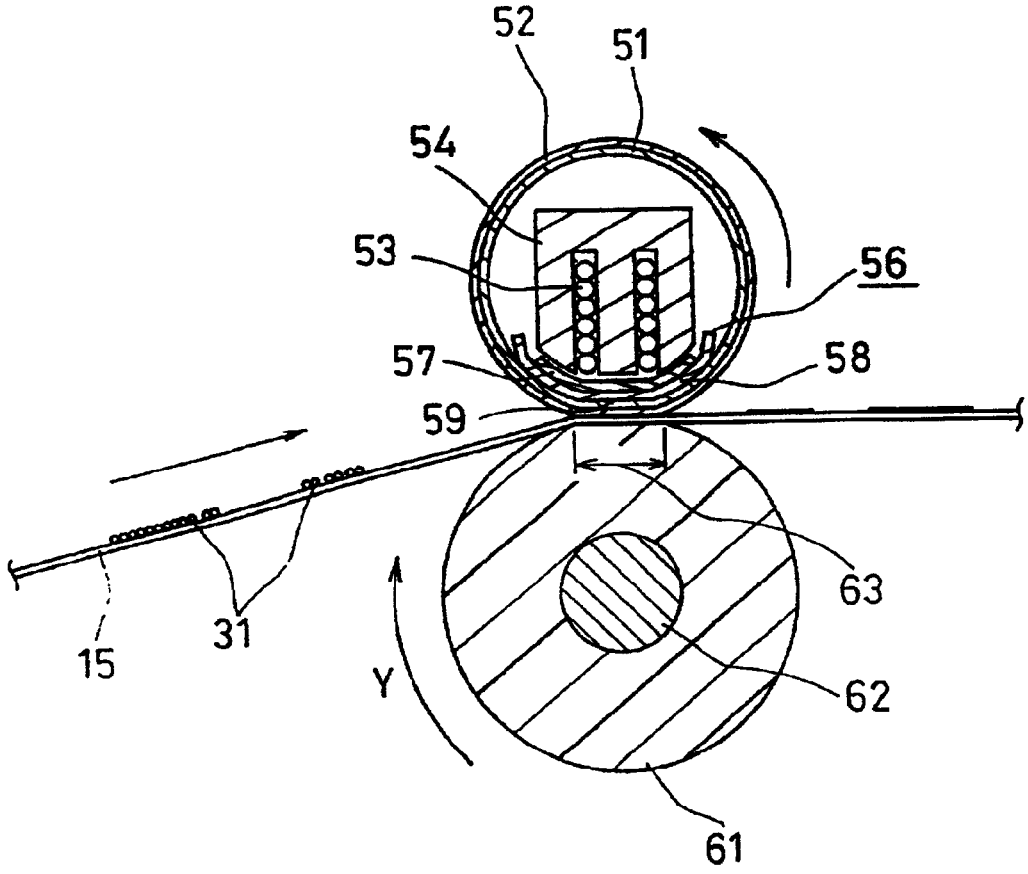
FIG. 5 is a cross-sectional view of the configuration of an image heating device according to a third example of the present invention.

The following is an explanation of a fixing device according to a third example of the present invention. FIG. 5 is a cross-sectional drawing showing the fixing device used as an image heating device according to the third example of the present invention, and FIG. 6 is a perspective view of the magnetization coil used for this fixing device.

In FIG. 5, numeral 51 denotes a thin film of 30 mm diameter and 50 $\mu$m thickness, which has been formed into a loop-shape by electroforming with Ni. The surface of the film 51 is coated with a lubricant layer 52 made of a fluorocarbon resin of 10 $\mu$m thickness, which enhances the lubrication to the toner. As a material for the film 51, metals such as Fe, Co, Cu, or Cr can be used alone or in combination. Heat is generated by the heat-generating member, which is described further below. For the film 51, a film-shaped heat-resistant non-metallic resin, such as polyimide resin or fluorocarbon resin can be used. For the lubricant layer 52, a resin or rubber with good lubrication, such as PTFE, PFA (tetrafluoroethylene perfluoroalkoxy vinyl ether copolymer), FEP (tetrafluoroethylene hexafluoropropylene copolymer), silicone rubber, or fluorocarbon rubber can be used alone or in combination. If the fixing device is used to fix monochrome images, only lubrication has to be ensured, but if it is used to fix color images, it is preferable that it enhances resilience, and it is necessary to use a little thicker rubber layer as the lubricant layer 52.

Figure 6:
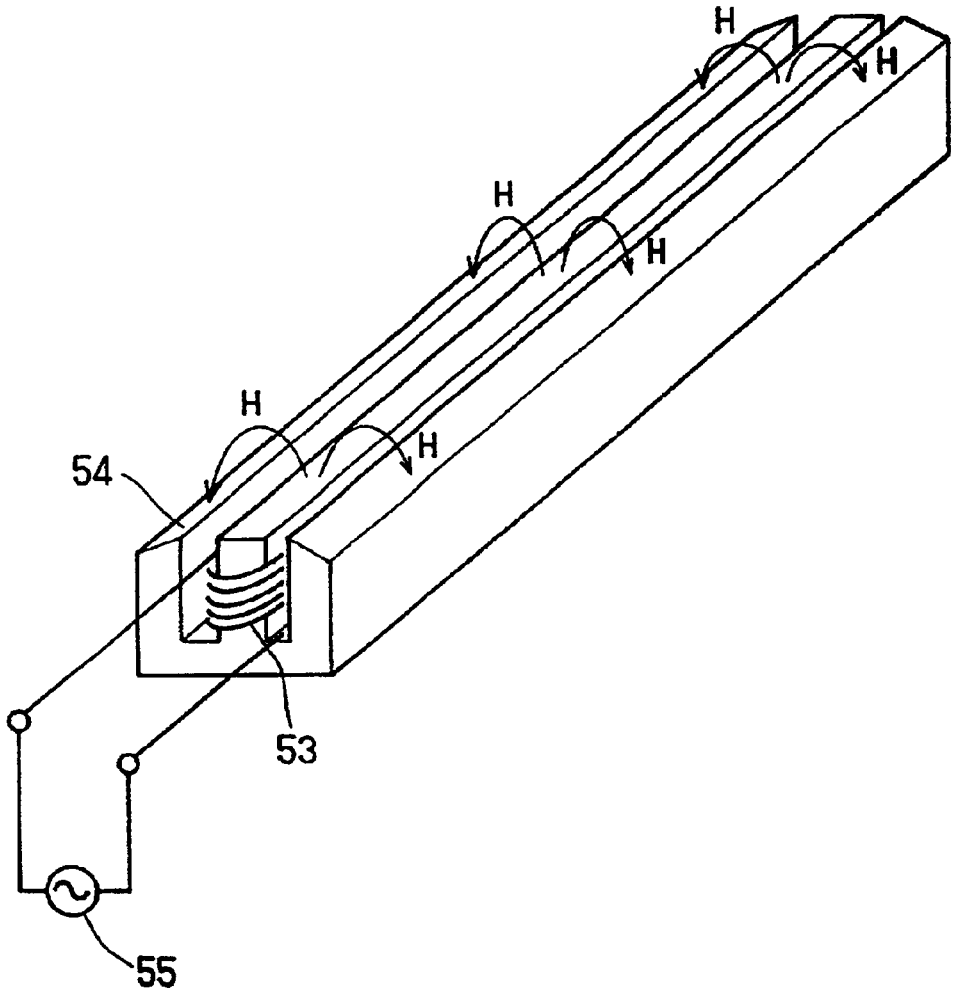
FIG. 6 is a perspective view showing a magnetization coil portion used in an image heating device according to a third example of the present invention.

In FIGS. 5 and 6, numeral 53 denotes the magnetization coil serving as a magnetization member. This magnetization coil 53 is wound around a core 54 made of a ferrite material. The core 54 is firmly supported by the main body of the image forming device. An alternating current of 30 kHz frequency is fed into the magnetization coil from an AC current source 55, causing the repeated generation and annihilation of magnetic flux around the magnetization coil 53 as indicated by arrow H in FIG. 6.

As is shown in FIG. 5, a heat-generating member 56 is provided in opposition to the magnetization coil 53 and the core 54, separated by a small gap. When this heat-generating member 56 is biased by a spring (not shown in the drawings) so that its lower surface contacts the inner surface (rear surface) of the film 51, it is supported by the main body of the image forming device. The core 54 is formed and arranged in a manner that the magnetic flux generated by the magnetization coil 53 penetrates especially the heat-generating member 56. This is achieved by providing the core 54 with an E-shaped cross-section and letting its opening space oppose the heat-generating member 56. In the present example, there is a gap between the magnetization coil 53, the core 54 and the heat-generating member 56, but it is also possible to fill this gap with insulating material.

The heat-generating member 56 comprises two metal plates that are fitted tightly to each other. On the side that is in opposition to the magnetization coil 53, the heat-generating member 56 has a 0.3 mm thick magnetic plate 57, serving as a magnetic layer, made of an alloy of iron and nickel and chrome (intrinsic resistance: $7.2\times10^{-7}$ Ωm; relative magnetic permeability at room temperature: ca. 100; relative magnetic permeability at Curie temperature: ca. 1), whose Curie temperature is set to about 200° C. by adjusting the amount of chrome in the alloy. On the side that contacts the film 51, the heat-generating member 56 has a 0.4 mm thick conductive plate 58, made of aluminum. The film 51, whose rotation is explained further below, moves while sliding along the surface of the conductive plate 58 of the heat-generating member. The heat-generating member 56 is arc-shaped, with a flat portion 59 at its center portion.

In this example, this configuration of the heat-generating member 56 provides it with the ability to regulate its own temperature. As in the second example, at room temperature the induction current concentrates in the magnetic plate 57 due to the skin effect, and as the temperature of the heat-generating member 56 approaches the Curie temperature, the magnetism of the magnetic plate 57 is lost, so that the magnetic flux emanates towards the outer conductive plate 58, and the induction current flows almost entirely inside the conductive plate 58 with low electric resistance. In this situation, the generation of heat decreases considerably, since the electric resistance of the conductive plate 58 is low. Calculations show that the depth of the portion where an induction current flows due to the skin effect at room temperature is about 0.25 mm at 30 kHz frequency. If the thickness of the magnetic plate 57 is the same as the skin depth or larger, then at low temperatures the induction current is generated almost entirely inside the magnetic plate 57. If the frequency of the electric current is raised, the skin depth decreases gradually, and a thinner magnetic plate 57 can be used accordingly. However, if the frequency of the magnetization current is too large, costs will rise, and the noise reaching the outside will become large.

In FIG. 5, numeral 61 denotes a pressure roller serving as a pressure member, which is made of resilient silicone rubber of 35 mm diameter and low hardness (25 degrees according to JIS A), which is formed in one piece with a metal axis 62. The pressure roller 61 is supported rotatably around its axis by the main body of the image forming device. As is shown in FIG. 5, the pressure roller 61 is pressed against the heat-generating member 56 via the film 51, while deforming its surface, so that it follows the flat portion 59 of the heat-generating member 56, thereby forming a nip portion 63. In this situation, the pressure roller 61 is rotated in the arrow direction Y by a driving system (not shown in the drawings), so that the film 51 is also rotated following the pressure roller 61.

The pressure roller 61 also can be made of a heat-resistant resin or rubber, such as fluorocarbon rubber or a fluorocarbon resin. Further, the surface of the pressure roller 61, can be coated with a resin or rubber such as PFA, PTFE, or FEP, alone or in combination, to enhance the abrasion resistance and lubrication of the pressure roller. Further, to avoid heat radiation, it is preferable that the pressure roller 61 is made of a material with low thermal conductivity.

A fixing device as described above was installed in the image forming device shown in FIG. 9, and toner 31 was fixed on a recording material 15. For this, the process speed was set to 100 mm/sec, and the recording material, onto which a toner image has been transferred, was inserted in the arrow direction into the fixing device with the side carrying the toner 31 facing the heat-generating member 56, as shown in FIG. 5.

Alternating current of 30 kHz frequency was supplied to the magnetization coil 53 of the fixing device from an AC current source 55, and a certain period of time after the heating of the heat-generating member 56 was started, the pressure roller 61 was rotated with a peripheral speed of 100 mm/sec. Then, the surface temperature of the heat-generating member was measured, and it could be determined that a certain period of time after the surface temperature of the heat-generating member departed from room temperature, if stabilized at about 180° C.

After the temperature had stabilized, the recording material 15 was conveyed continuously by the nip portion 63, and the surface temperature of the heat-generating member 56 near the outgoing portion of the nip portion 63 was measured, and it was determined that the surface temperature of the heat-generating member 56 near the outgoing portion of the nip portion 63 was about 170° C. Consequently, in this example, the temperature difference between the surface temperature of the heat-generating member 56 near the outgoing portion of the nip portion 63 and the Curie temperature was about 30° C.

According to this example, the heat-generating member 56 itself has the ability to regulate its own temperature, so that the heat-generating member 56 does not become excessively hot, and by setting the Curie temperature to a suitable value with regard to the fixing temperature, the temperature regulation near the fixing temperature can be performed automatically. Consequently, even without a temperature detecting means, such as the thermistor, or temperature controlling circuits, suitable heating conditions can be attained. If a heating member with low thermal capacity such as the film 51 in this example is used, a partial temperature in the depth direction of FIG. 5 occurs easily. However, the ability of the heat-generating member 56 to regulate its own temperature also causes a partial difference in the heat generation, so that even when a recording material 15 of narrow width is conveyed continuously by the nip portion 63, the portion where the recording material 15 does not pass does not become excessively hot, and when subsequently a recording material 15 of broader width is conveyed continuously by the nip portion 63, hot offset does not occur. Consequently, since the thermal capacity of the heat-generating member 56 or the film 51 serving as a heating member can be decreased within the scope where temperature self-regulation is possible, the warming-up time can be shortened.

Since the material, thickness etc. of the heat-generating material 56 can be chosen independently from the film 51, the material, thickness and shape most suitable for temperature self-regulation can be selected, and the thermal capacity of the film 51 also be selected individually.

In this example, aluminum was used for the conductive plate 58, but it is also possible to use another metal with high conductivity such as copper. Furthermore, the same effect can be attained when another alloy with adjustable Curie temperature is used for the magnetic plate 57. Moreover, it is also possible to provide a very thin lubricant layer of fluorocarbon resin, that is thin enough, perhaps several $\mu$m or so, that it hardly influences the thermal conductivity of the surface that slides against the film 51 of the conductive plate 58.

Furthermore, in this example, the heat-generating member 56 has a dual layer structure, but it is also possible to use a heat-generating member of a single magnetic material that is at least twice as thick as the skin depth.

By using for the heat-generating member one magnetic plate that is about as thick as the skin depth, and using for the film 51 for example a highly conductive material such as copper, it is possible to reduce the induction current flowing in a portion of the film 51 above the Curie temperature and reduce the generated heat In other words, if $$\rho 1/t\mathbf{1} \geqq \rho 2/t\mathbf{2} \quad \text{(Eq. 1)}$$

wherein the intrinsic resistance of the magnetic plate, which serves as the heat-generating member, is $\rho 1$ and its thickness is t1, and the intrinsic resistance and the thickness of the highly conductive film 51 are $\rho 2$ and t2, then the ratio of the amount of heat generated above the Curie temperature to the amount of heat generated at room temperature can be set to ½ or less. For example, the intrinsic resistance of the film 51 made of copper is $1.7\times10^{-8}$ Ωm, and that of the above-noted magnetic alloy is only 1/42 of that, so that this condition can be met if the thickness of the film 51 is about 7 $\mu$m or more.

By using for the heat-generating member one magnetic plate that is about as thick as the skin depth, and using a highly conductive material such as aluminum for the inside portion of the pressure roller 61 opposing it, an induction current flows in the portion of the highly conductive material above the Curie point, and it is possible to reduce the heat generation almost to zero.

Moreover, if the frequency of the magnetization current (AC current) is increased and a material with large magnetic permeability or low intrinsic resistance is used, the skin depth can be reduced, so that it is also possible to use a film satisfying the above conditions for the heat-generating member.

Fourth Example

Figure 7:
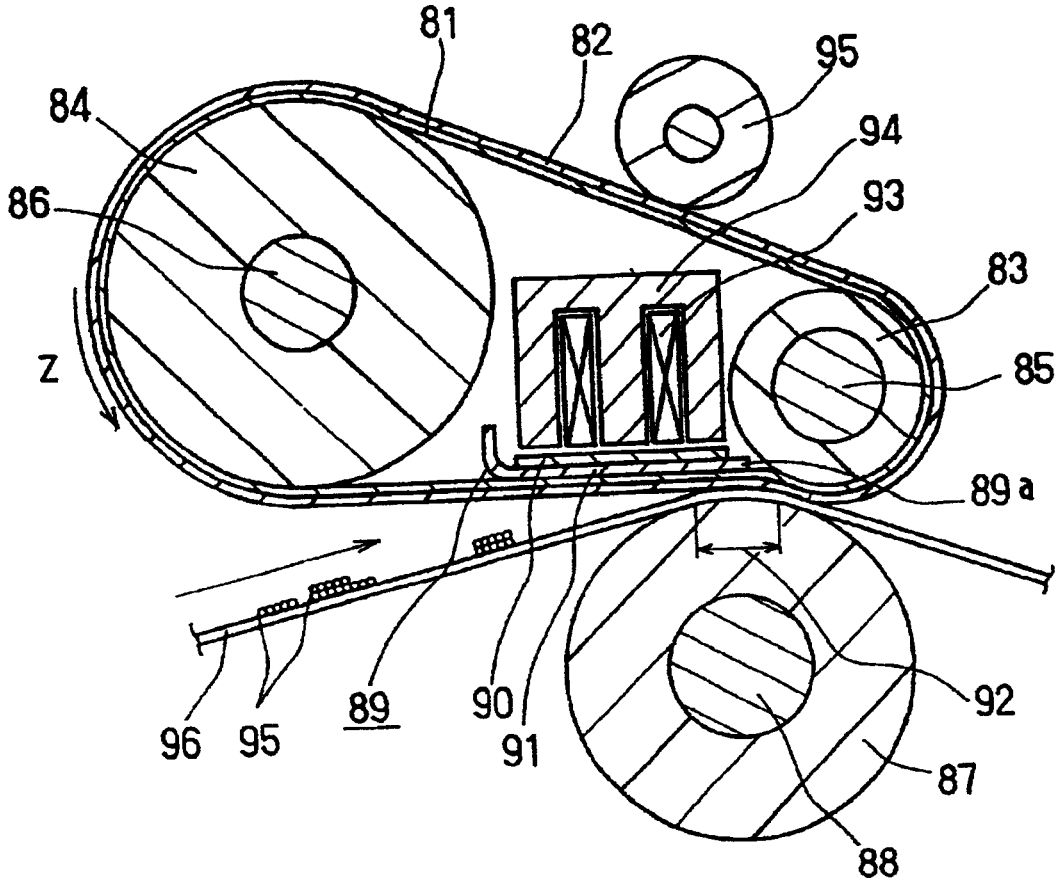
FIG. 7 is a cross-sectional view of the configuration of an image heating device according to a fourth example of the present invention.

Referring to FIG. 7, the following is an explanation of a fourth example of an image device used for an image forming device, that is particularly suitable for fixing color images.

In this example, elements having the same structure and performing the same function as in the fixing device of the third example are referred to with the same numerals and their further explanation has been omitted.

With respect to material and thickness, the film 81 of this example is the same as the film of the third example, but in this example, the film diameter was set to 80 mm. The surface of the film 81 is covered with a 50 $\mu$m layer of silicone rubber 82 for fixing color images. Also in this example, the heat generation is performed with a heat-generating member 89 explained further below, so that a film-shaped heat-resistant non-metallic resin such as a polyimide resin or fluorocarbon resin can be used for the film 81. The film 81 is suspended with a certain tensile force by a first roller 83 of 30 mm diameter and a second roller 84 of 40 mm diameter, and is rotatable in arrow direction Z. The first roller 83 is an elastic roller with low thermal conductivity made of foamed silicone rubber with low hardness (35 degrees according to ASKER C), which is formed in one piece with a metal axis 85. Moreover, a second roller 84 is made of silicone rubber with a hardness of JSI A60 degrees, which is formed in one piece with a metal axis 86. The metal axis 85 can be driven by a driving system of the main body to rotate the film 81. A pressure roller 87 is made of silicone rubber with a hardness of JIS A60 hardness, and presses against the first roller 83 via the film 81, thereby forming a nip portion 92. In this situation, the first roller 83 is rotated, so that the pressure roller 87 with the metal axis 88 at its center is also rotated following the first roller 83.

On the inner side of the film 81, a heat-generating member 89 is provided between the first roller 83 and the second roller 84. The heat-generating member 89 is supported by the main body of the image forming device, and biased by a spring downwards in FIG. 9, so that it is pressed against the inner surface (rear surface) of the film 81. The reason why the heat-generating member 89 is pressed against the film 81, is to make heat transmission possible, and since this is unrelated to the formation of the nip portion 92 for fixing the toner, the pressure force can be small. As in the third example described above, the heat-generating member 89 has a dual layer structure of a magnetic plate 90 serving as a magnetic layer on the inside and a conductive plate 91 serving as a highly conductive layer on the side of the film 81, whose material and thickness is the same as for the third example. Moreover, a tip portion 89a, which is located on a side of the conductive plate 91 in film-moving direction, extends to the nip portion 92 formed between the film 81 and the pressure roller 87. This presses a portion of the nip portion 92 lightly against the inner surface (rear surface) of the film 81. On the inside of the film 81, a magnetization coil portion including a core material 94 made of ferrite and a magnetization coil 93 serving as a magnetizing member is provided in opposition to the heat-generating member 89 with a small gap between the magnetization coil portion and the heat-generating member 89. The magnetization coil portion is attached firmly to the main body of the image forming device. The shape of this magnetization coil portion is basically the same as the magnetization coil portion of FIG. 6 used in the third example.

An oil roller 95, which is impregnated with lubricant oil, is pressed lightly against the outer peripheral surface of the film 81 so that it can be driven and rotated by the film 81. When the film 81 is moved, a certain amount of lubricant oil is supplied to the surface of the silicone rubber 82 of the film 81.

A fixing device as described above was installed in a color image forming device (not shown in the drawings), and color toner 95 was fixed on a recording material 96. For this, the process speed was set to 150 mm/sec, and the recording material 96, onto which a toner image has been transferred, was inserted in the arrow direction into the fixing device with the side carrying the color toner 95 facing the film 81, as shown in FIG. 7.

The color toner 95 used for this example is a sharp-melting color toner based on polyester, which has a glass transition point of 58° C. and a softening point of 170° C. For this color toner 95, it was determined that between the color toner 95 and the film 81 onto which the lubricant oil of this example has been applied, cold offset occurred when the maximum temperature of the film 81 at the speed set for this example is less than 150° C., and that hot offset occurred when the temperature of the film 81 at the outgoing portion of the nip portion 92 exceeded 190° C.

In this example, the Curie temperature of the magnetic plate 90 was set to 230° C., and the heat-generating member 89 had the ability to regulate its average temperature and stabilize it at about 200° C. when recording material 96 was continuously conveyed by the nip portion 92. Furthermore, it was measured that the surface temperature of the film 81 near the outgoing portion of the nip portion 92 stabilized at about 170° C. while recording material 96 was being transported. In the configuration of this example, the recording material 96 is passed along the nip portion 92 while it takes in heat from the film 81, after the film 81 is supplied with heat by the heat-generating member 89. However, because the thermal capacity of the film 81 is set to a low value, the surface temperature of the film 81 at the outgoing portion of the nip portion 92 decreases considerably compared to the surface temperature of the film 81 at the ingoing portion of the nip portion 92. Consequently, the temperature difference between the surface temperature of the film at the outgoing portion of the nip portion 92 and the Curie temperature becomes 60° C., which is higher than in the first or second example.

The decrease of the surface temperature of the film 81 at the outgoing portion of the nip portion 92 becomes larger, the smaller the thermal capacity of the film 81 is. The film 81 used for this example comprises a 50 μm thick nickel based, onto which a 50 μm thick silicone rubber has been formed. The thermal capacity of this film 81 can be calculated to be about 0.005 cal/° C. per 1 $cm^2$. In this method of heating the film 81 at the ingoing portion of the nip portion 92 and performing the fixing with the retention heat, if the thermal capacity is made even smaller, the temperature decrease when the film 81 protrudes into the nip portion 92 becomes even larger and cold offset occurs easily. Consequently, in this example, the temperature difference between the surface temperature of the film 81 at the outgoing portion of the nip portion 92 and the Curie temperature is possibly the largest of all these fixing methods.

Therefore, in all of the above-noted fixing methods, including this example, the maximum value for the temperature difference between the surface temperature of the film at the outgoing portion of the nip portion and the Curie temperature is 60–70° C.

Thus, it could be determined that a necessary condition for the Curie temperature Tk in all these fixing methods is $$Tc \leqq Tk \leqq Th + 70^\circ\ C. \qquad \text{(Eq. 2)}$$

Very often, the temperature Tc at which cold offset between toners, including color toners, and heating rollers or films including a lubricant layer of for example a fluorocarbon resin, silicone rubber, fluorocarbon rubber, etc. sets in and the temperature Th at which hot offset sets in is at least about 140° C. and at most about 210° C. Consequently, the above condition can be written more precisely as $$140^\circ\ C. \leqq Tk \leqq 280^\circ\ C. \qquad \text{(Eq. 3)}$$

According to this example, as in the third example, the heat-generating member 89 has due to its configuration the ability to regulate its own temperature, so that the film 81 does not become excessively hot and by setting the Curie temperature to a suitable value with regard to the fixing temperature, the temperature regulation can be performed automatically at temperatures near the fixing temperature. Consequently, even without a temperature detecting means, such as the thermistor, or temperature controlling circuits, suitable heating conditions can be attained. If a heating member with low thermal capacity such as the film 81 in this example is used, a partial temperature difference in the depth direction of FIG. 7 occurs easily. However, the ability of the heat-generating member 89 to regulate its own temperature also causes a partial difference in the heat generation, so that even when a recording material 96 of narrow width is conveyed continuously by the nip portion 92, the portion where the recording material 96 does not pass does not become excessively hot, and when subsequently a recording material 96 of broader width is conveyed continuously by the nip portion 92, hot offset does not occur. Consequently, since the thermal capacity of the heat-generating member 89 or the film 81 serving as a heating member can be decreased within the scope where temperature self-regulation is possible, the warming-up time can be shortened.

According to this example, the tip portion 89a of the heat-generating member 89 extends to the vicinity of the nip portion 92 and supplies the necessary heat at the nip portion 92. On the other hand, the magnetization coil 93 and the core material 94 can be arranged upstream from the nip portion 92, so that they do not heat up due to the influence of the nip portion 92. As a result, the amount of heat generated can be maintained at a stable level. Furthermore, since the tip portion 89a of the heat-generating member 89 extends to the vicinity of the nip portion 92, the temperature at the front half of the nip portion 92 can be controlled precisely.

Consequently, it is possible to perform fixing with sufficient melting and no hotmelt offset, even in the case of sharp-melting color toner, whose semi-fused state is comparatively short.

Moreover, according to this example, the forming of the nip portion 92, which requires strong pressures, is performed by pressing it between the first roller 83 and the pressure roller 87, so that there is no portion that slides while being subjected to a strong frictional force due to the forming of the nip portion 92, and a fixing device can be realized that, in comparison to the third example, is suitable for operation at higher speeds for longer times.

According to this example, when the film 81 starts to contact the recording material 96, heat starts to be transferred to the recording material 96. And, because the thermal capacity of the film 81 can be reduced, the temperature of the film 81 decreases sharply when the film 81 has passed the tip portion 89a of the heat-generating member 89, so that the toner is not as easily hot-offset when the recording material 96 passes the nip portion 92 and separates from the film 81. Consequently, hot-offset does not occur even when the temperature at the ingoing portion of the nip portion 92 is set relatively high.

The first roller 83 positioned on the inner side (rear surface side) of the film 81 is made of a foam with low thermal conductivity, so that due to the voids inside the first roller 83 the heat generated in the film 81 does not escape very easily, and a fixing device with good thermal efficiency can be attained.

In this example, a heat-generating member 89 with a dual layer configuration of a highly conductive layer (conductive plate 91) layered on a magnetic layer (magnetic plate 90) was used, but it is also possible to use a heat-generating member comprising only a magnetic layer, and make the film 81 highly conductive by using for example copper for it, so that above the Curie temperature most of the induction current flows in the film 81. Also in this case, if $$\rho 1/t1 \geqq \rho 2/t2 \qquad \text{(Eq. 1)}$$

wherein the intrinsic resistance of the magnetic layer serving as a heat-generating member is $\rho 1$ and its thickness is t1, and the intrinsic resistance and the thickness of the film 81 serving as a highly conductive layer are $\rho 2$ and t2, then the ratio of the amount of heat generated above the Curie temperature to the amount of heat generated at room temperature can be set to ½ or less.

Furthermore, it is also possible to provide a highly conductive layer in a non-contacting manner in opposition to the heat-generating member that comprises a magnetic layer, and that is adjacent to the outer side of the film 81. If the distance between the two layers is within a certain distance, temperature self-regulation can be attained. If such a highly conductive layer is provided separately to the heat-generating member, the thermal capacity of the heat-generating member can be reduced even further.

Fifth Example

Figure 8:
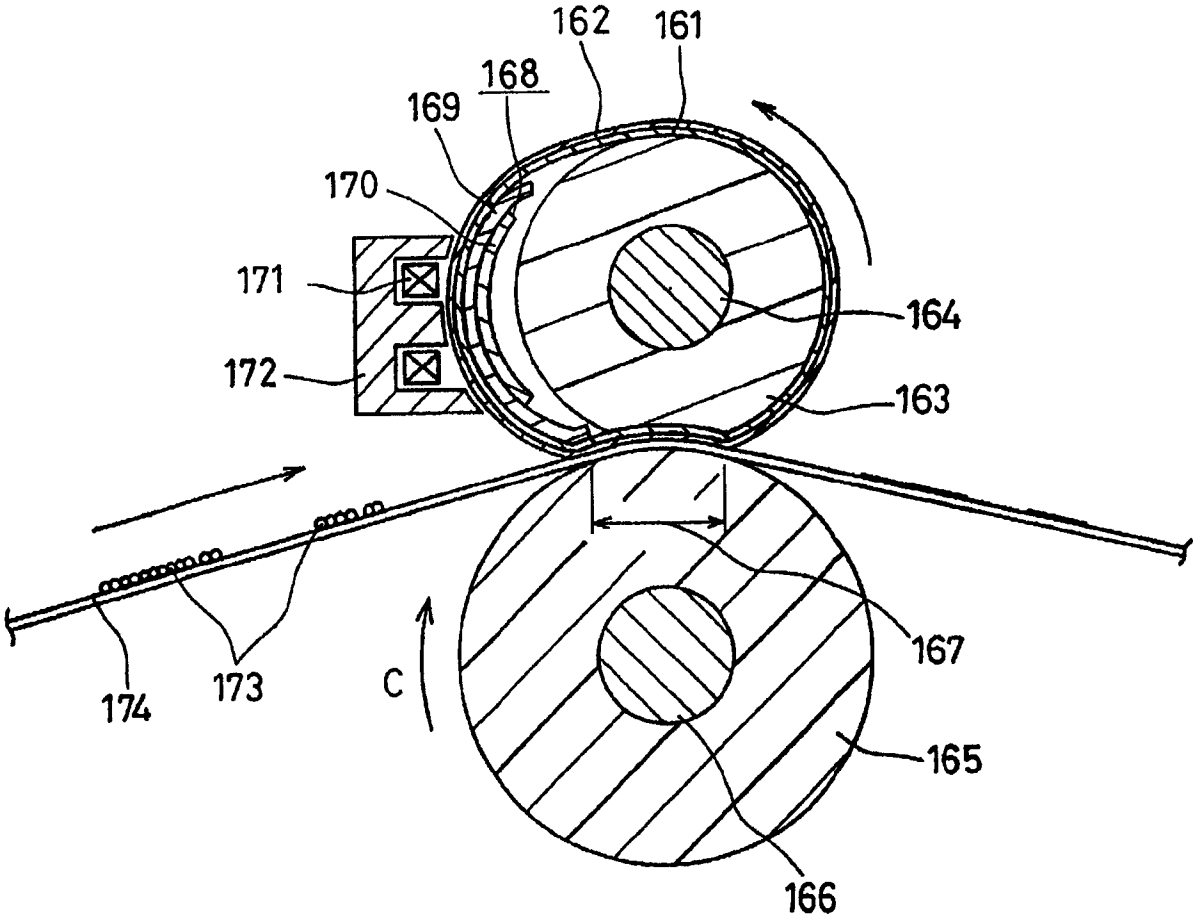
FIG. 8 is a cross-sectional view of the configuration of an image heating device according to a fifth example of the present invention.

Referring to FIG. 8, the following is an explanation of a fifth example of an image device used for an image forming device.

In this example, elements having the same structure and performing the same function as in the fixing device of the fourth example are referred to with the same numerals and their further explanation has been omitted.

As shown in FIG. 8, in this example, a film 161, which is a polyimide base of 70 $\mu$m thickness and 30 mm diameter, is coated with a 10 $\mu$m fluorocarbon resin serving as a lubricant film 162. The film 161 is wound around an upper roller 163 of 25 mm diameter, which is rotatable in the arrow direction. This upper roller 163 has elasticity and low thermal conductivity, and includes foamed silicone rubber with low hardness (ASKERC 35 degrees), which is formed in one piece with a metal axis 164. Moreover, a pressure roller 165 is made of silicone rubber with higher hardness (JIS A60 degrees) than the upper roller 163, and is formed in one piece with a metal axis 166. The pressure roller 165 is pressed against the upper roller 163 via the film 161, and due to the hardness difference, the upper roller 163 is deformed as shown in FIG. 8, thereby forming a nip portion 167. In this situation, the pressure roller 165 is rotated by a driving system (not shown in the drawings) in arrow direction C, followed by the film 161 and the upper roller 163, which are thus caused to rotate in the arrow direction, as shown in FIG. 8. A heat-generating member 168 is provided at the inner side (rear surface side) of the film 161 and downstream of the nip portion 167. This heat-generating member 168 is supported by the main body of the image forming device, and is biased by a spring towards the left side in FIG. 8, so as to be pressed against the film 161. Because the film 161 and the heat-generating member 168 are pressed against each other, heat transmission is possible, and because they are not related to the formation of the nip portion 167 for adhering toner, this pressure can be small. Therefore, the friction between the film 161 and the heat-generating member 168 can be small, and the film 161 is not abraded easily. Other than in the above-noted fourth example, the heat-generating member 168 comprises a magnetic plate 169 as a first layer on the outside, sliding in contact against the film 161, and a conducting plate 170 as a second inner layer. The material and the thickness of these layers can be the same as in the fourth example. At the position opposing the heat-generating member 168, a magnetic coil 171 and a core 172 are provided, so that the heat-generating member 168 and the magnetic coil 171 and the core 172 sandwich the film 161, with a small gap being provided between the film 161 and the coil 171 and the core 172.

The recording material 174, onto which a toner image has been applied, was inserted in the arrow direction into this fixing device with the surface on which the toner 173 is applied facing the film 161, as shown in FIG. 8, and the toner 173 was fixed on the recording material 174.

According to this example, the same temperature self-regulation as in the fourth example can be attained due to the configuration of the heat-generating member 168, so that the temperature of the film 161 does not become excessively high and that by setting the Curie temperature to a suitable value with regard to the fixing temperature, the temperature regulation to a temperature near the fixing temperature can be performed automatically. Consequently, even without a temperature detecting means, such as the thermistor, or temperature controlling circuits, suitable heating conditions can be attained. Especially when a heating member with low thermal capacity such as the film 161 in this example is used, partial temperature differences in the depth direction in FIG. 8 occur easily. But since the ability of the heat-generating member 168 to regulate its own temperature also causes a partial difference in the heat generation, even when a recording material 174 of narrow width is conveyed continuously by the nip portion 167, the portion where the recording material 174 does not pass does not become excessively hot, and when subsequently a recording material 174 of broader width is conveyed continuously by the nip portion 167, there is no hot offset. Consequently, since the thermal capacity of the heat-generating member 168 and the film 161 serving as the heating member can be decreased within the scope where temperature self-regulation is possible, the warming-up time can be shortened.

Furthermore, according to this example, the formation of the nip portion 167, which requires a strong pressure force, is performed by the pressure between the upper roller 163 and the pressure roller 165, so that there is no portion that slides while a large friction force is exerted to form the nip portion 167, realizing a fixing device that is suitable for operation at higher speeds over extended periods of time compared with the one of the third example.

Furthermore, according to this example, since the heat-generating member 168 can be provided on the inner side (rear surface side) of the film 161, whereas the magnetic coil 171 and the core 172 can be provided on the outer side of the film 161, the coil 171 etc. is not subjected to the influence of the temperature of the heat-generating member 168. As a result, the amount of generated heat is stabilized.

Furthermore, according to this example, at the nip portion 167, the film 161 deforms along the outer peripheral surface of the pressure roller 165, so that when the recording material 174 passes through the nip portion 167, the direction in which it leaves the nip portion is the direction in which it also separates from the film 161, so that the defoliation of the recording material 174 from the film 161 becomes much easier.

Moreover, the upper roller 163 positioned on the inner side (rear surface side) of the film 161 can be made of a foamed material with low thermal conductivity, so that due to the voids inside the upper roller 163 the heat generated in the film 161 does not escape very easily, and good thermal efficiency can be attained.

In this example, a magnetic plate 169 attached firmly to a conductive plate 170 is used as the heat-generating member 168, but the same temperature self-regulation can also be attained when there is a small air gap between the two. In this case, it is not necessary to heat the conductive plate 170, so that the thermal capacity of the heat-generating member can be reduced even further.

Furthermore, in this example, the magnetic plate 169 is fixed, and slides along the film 161, but it is also possible to provide a rotatable cylindrical magnetic roller corresponding to this magnetic plate 169, and wrap the film 161 around this roller and the upper roller 163. In this case, the sliding portion can be reduced further, and an operation at higher speeds over extended periods of time becomes possible. Furthermore, in this case, if the portion corresponding to the conducting plate 170 is positioned in a non-contacting manner inside this magnetic roller the thermal capacity of the heat-generating member can be reduced even further.

Moreover, in these examples, the self-regulation temperature of the heat-generating member is set to the fixing temperature, but the present invention is not restricted to this configuration, and it is also possible to perform the control of the fixing temperature based on the detection of for example a regular thermistor, and to set the self-regulation temperature higher to prevent an excessive temperature rise, in order to ensure the protection against damages due to high temperatures in the device.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An image heating device comprising:

a heat-generating member comprising a magnetic layer with a certain Curie temperature;

a magnetization member for magnetizing said heat-generating member with an alternating magnetic field, which is arranged in opposition to said heat-generating member;

a nip portion for heating a recording material that carries a toner image with heat from said heat-generating member, while the recording material is being conveyed along said nip portion;

wherein a ratio between an amount of heat generated in said heat-generating member at Curie temperature or higher to an amount of heat generated at room temperature in said heat-generating member is not more than ½.

2. The image heating device of claim 1, wherein a thickness of said magnetic layer is at least twice a thickness of a skin depth.

3. The image heating device of claim 1, wherein said heat-generating member further comprises a conductive layer with lower resistance than said magnetic layer, which is provided adjacent to said magnetic layer.

4. The image heating device of claim 3, wherein $$\rho 1/t1 \geqq \rho 2/t2$$

wherein $\rho 1$ is an intrinsic resistance of said magnetic layer, t1 is a thickness of said magnetic layer, $\rho 2$ is an intrinsic resistance of said conductive layer, and t2 is a thickness of said conductive layer.

5. The image heating device of claim 3, wherein the thickness of said magnetic layer is equivalent to or greater than the skin depth.

6. The image heating device of claim 1, wherein said nip portion is formed by at least a portion of said heat-generating member, and a pressure member pressed against this portion of said heat-generating member.

7. The image heating device of claim 6, wherein at least said magnetic layer of said heat-generating member is a rotatable roller.

8. The image heating device of claim 6, wherein at least said magnetic layer of said heat-generating member is a movable film.

9. The image heating device of claim 8, wherein said film is loop-shaped.

10. The image heating device of claim 6, wherein at least a conductive layer of said heat-generating member is a movable film.

11. The image heating device of claim 1, wherein the nip portion is formed by a movable film contacting said heat-generating member, and a pressure member for pressing against said film.

12. The image heating device of claim 11, wherein said heat-generating member contacts a rear surface of said film.

13. The image heating device of claim 11, wherein said heat-generating member contacts the rear surface of said film from a position upstream of said nip portion to a vicinity of said nip portion, and said magnetization member is provided at the position upstream of said nip portion.

14. The image heating device of claim 11, wherein said heat-generating member is provided on the rear side of said film and contacts a portion of said film, and said magnetization member is provided on a surface side of said film.

15. The image heating device of claim 11, wherein the pressure member comprises a roller with low thermal conductivity provided on the rear surface side of said film and a pressure roller provided on the front surface side of said film.

16. The image heating device of claim 11, wherein said heat-generating member comprises a rotatable roller.

17. An image formation device comprising an image formation means for forming an unfixed image onto a recording material; and a thermal fixing device for thermally fixing the unfixed image on the recording material;

wherein an image heating device according to claim 1 is used as the thermal fixing device.

18. An image heating device comprising:

a heat-generating member comprising a magnetic layer with a certain Curie temperature;

a magnetization member for magnetizing said heat-generating member with an alternating magnetic field, which is arranged in opposition to said heat-generating member;

wherein, when said device is in operation, a temperature at which said heat-generating member stabilizes due to a drop of a relative magnetic permeability of said magnetic layer near said Curie temperature is higher than a temperature where cold offset begins, and wherein said Curie temperature is selected such that, when the temperature of said heat-generating member is stabilized, a temperature of an outgoing portion of a nip portion is lower than a temperature where hot offset of the toner begins.

19. The image heating device of claim 18, wherein said heat-generating member further comprises a conductive layer with lower resistance than said magnetic layer, which is provided adjacent to said magnetic layer.

20. The image heating device of claim 19, wherein $$\rho 1/t\mathbf{1} \geqq \rho 2/t\mathbf{2}$$

wherein ρ1 is an intrinsic resistance of said magnetic layer, t1 is a thickness of said magnetic layer, ρ2 is an intrinsic resistance of said conductive layer, and t2 is a thickness of said conductive layer.

21. The image heating device according to claim 18, wherein $$Tc \leqq Tk \leqq Th + 70^\circ\ C.$$

wherein Tc is the temperature where cold offset of the toner begins in said nip portion, Tk is the Curie temperature, and Th is the temperature where hot offset of the toner begins in an outgoing portion of said nip portion.

22. The image heating device according to claim 18, wherein $$140^\circ\ C. \leqq Tk \leqq 280^\circ\ C.$$

wherein Tk is the Curie temperature.

23. The image heating device of claim 18, wherein said nip portion is formed by at least a portion of said heat-generating member, and a pressure member pressed against this portion.

24. The image heating device of claim 23, wherein at least said magnetic layer of said heat-generating member is a rotatable roller.

25. The image heating device of claim 23, wherein at least said magnetic layer of said heat-generating member is a movable film.

26. The image heating device of claim 23, wherein at least said conductive layer of said heat-generating member is a movable film.

27. The image heating device of claim 18, wherein the nip portion is formed by a movable film contacting said heat-generating portion, and a pressure member for pressing against said film.

28. The image heating device of claim 27, wherein said heat-generating member contacts a rear surface of said film.

29. The image heating device of claim 27, wherein said heat-generating member contacts the rear surface of said film from a position upstream of said nip portion to a vicinity of said nip portion, and said magnetization member is provided at the position upstream of said nip portion.

30. The image heating device of claim 27, wherein said heat-generating member is provided on the rear side of said film and contacts a portion of said film, and said magnetization member is provided on a surface side of said film.

31. The image heating device of claim 27, wherein the pressure member comprises a roller with low thermal conductivity provided on the rear surface side of said film and a pressure roller provided on the front surface side of said film.

32. The image heating device of claim 27, wherein said heat-generating member comprises a rotatable roller.

33. The image heating device of claim 27, wherein said film is loop-shaped.

34. An image formation device comprising an image formation means for forming an unfixed image onto a recording material; and a thermal fixing device for thermally fixing the unfixed image on the recording material;

wherein an image heating device according to claim 18 is used as the thermal fixing device.

*35. An image heating device comprising:*

*a heat-generating member comprising a magnetic layer;*

*a magnetization member for magnetizing said heat-generating member with an alternating magnetic field, which is arranged in opposition to said heat-generating member;*

*a nip portion for heating a recording material that carries a toner image with heat from said heat-generating member, while the recording material is being conveyed along said nip portion; and*

*a movable film that is separated from the heat generating member, the nip portion being formed between a pressure roller and the movable film;*

*wherein the heat-generating member contacts a contact part of the movable film and is arranged so as to be opposed to the magnetization member at a different position from that of the nip portion, and transmits generated heat to the movable film at the contact part.*

*36. The image heating device of claim 35, wherein said heat-generating member contacts a rear surface of said film.*

*37. The image heating device of claim 35, wherein said heat-generating member contacts the rear surface of said film from a position upstream of said nip portion to a vicinity of said nip portion, and said magnetization member is provided at the position upstream of said nip portion.*

*38. The image heating device of claim 35, wherein said heat-generating member is provided on the rear side of said film and contacts a portion of said film, and said magnetization member is provided on a surface side of said film.*

*39. The image heating device of claim 35, further comprising a pressure member with low thermal conductivity provided on the rear surface side of said film, and wherein the pressure roller is provided on the front surface side of said film.*

*40. The image heating device of claim 35, wherein said heat-generating member comprises a rotatable roller.*

* * * * *